(12) United States Patent
Parker

(10) Patent No.: US 7,828,980 B2
(45) Date of Patent: Nov. 9, 2010

(54) WATER TREATMENT PROCESS

(75) Inventor: Garth R. Parker, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 421 days.

(21) Appl. No.: 12/079,298

(22) Filed: Mar. 26, 2008

(65) Prior Publication Data

US 2008/0251461 A1    Oct. 16, 2008

Related U.S. Application Data

(60) Provisional application No. 60/912,015, filed on Apr. 16, 2007.

(51) Int. Cl.
    *C02F 1/00*    (2006.01)
(52) U.S. Cl. .................... 210/748.17; 210/748.2
(58) Field of Classification Search ............ 210/748.17, 210/748.2
    See application file for complete search history.

(56) References Cited

U.S. PATENT DOCUMENTS

| 3,989,624 | A | 11/1976 | Wachsmuth |
| 4,671,879 | A | 6/1987 | Solt et al. |
| 5,599,437 | A * | 2/1997 | Taylor et al. ............... 205/744 |
| 5,614,078 | A * | 3/1997 | Lubin et al. ................ 205/743 |
| 6,531,050 | B1 | 3/2003 | Waite |
| 2004/0173471 | A1 | 9/2004 | Velin et al. |
| 2004/0256317 | A1 | 12/2004 | Yamada et al. |
| 2005/0029124 | A1 | 2/2005 | Holmes et al. |
| 2005/0115905 | A1 | 6/2005 | Yan et al. |

FOREIGN PATENT DOCUMENTS

| DE | 19815669 C2 | 10/1999 |
| DE | 19815669 C2 | 5/2001 |
| JP | 2006-239589 A | 9/2006 |
| WO | 03074430 A1 | 9/2003 |
| WO | WO 2005/070836 A | 8/2005 |

OTHER PUBLICATIONS

Peel J. W., et al., "Electrocatalytic reduction of nitrate in water", Water Research, Elsevier, Amsterdam, NL, vol. 37, No. 10, pp. 2512-2519 (May 1, 2003).
Extended European Search Report (Jul. 25, 2008).

* cited by examiner

*Primary Examiner*—Chester T Barry
(74) *Attorney, Agent, or Firm*—Thomas S. Deibert

(57) ABSTRACT

A process for removing target ion(s) from a for-treatment water containing the target ion(s) is provided. Also provided is a method for improving the efficiency of an electrochemical cell for target ion(s) destruction.

9 Claims, 9 Drawing Sheets

WATER TREATMENT PROCESS

This application claims priority to U.S. Provisional Application 60/912,015 filed Apr. 16, 2007.

The present invention relates to a method of removing target ion(s) from a for-treatment water containing the target ion(s). The present invention also relates to a method for improving the efficiency of an electrochemical cell for target ion(s) destruction.

In recent decades, ion contamination of raw water sources has been increasing. For example, nitrate content in raw water sources has increased due in part to the intensive use of nitrogenous fertilizers, changes in land-use patterns (i.e., to more intensive crop generation), and contamination of raw water sources with sewage and industrial effluents. Such ion contamination has, in at least some instances, been linked to adverse health effects. For instance, increased nitrate uptake has been linked to several health hazards causing methoaemolobinaemia or cancer risks due to nitrosamines or nitrosamides. In response, some localities have put in place drinking water standards that limit the maximum nitrate levels in drinking water for human consumption.

One method for target ion removal from drinking water is disclosed in U.S. Patent Application Publication No. 2004/0173471 to Velin et al. Velin et al. disclose a process for the removal and destruction of dissolved nitrate from ground water or aqueous effluents containing the same, especially water and effluents containing at most 500 mg/L of nitrate, which comprises a removal step where nitrate is eliminated from said water or effluent in the form of a more concentrated solution thereof, and a destruction step where said more concentrated nitrate solution is subjected to an electrolysis operation for nitrate destruction by electrochemical reduction thereof, the electrolysis operation being performed in several cycles in a divided cell with anolyte and catholyte compartments, where said concentrated nitrate solution is initially used as a catholyte and spent catholyte is then used as an anolyte. Velin et al. further discloses performing a reversal of the polarities of the anolyte and catholyte compartments during the nitrate reduction cycle.

Notwithstanding, a need still exists for new, efficient methods for treating water to remove target ions therefrom.

In one aspect of the present invention, there is provided a process for removing a target ion from a for-treatment water containing the target ion, comprising: (a) passing a target rich water through an electrochemical cell comprising an anode and a cathode, and (b) passing a current between the anode and the cathode; wherein the target ion is destroyed during a destruct cycle producing a target ion depleted water, wherein the current is periodically interrupted during the destruct cycle while the target ion rich water is passing through the electrochemical cell and wherein the target ion is selected from nitrate, nitrite, perchlorate, chlorate and combinations thereof.

In another aspect of the present invention, there is provided a method for improving the efficiency of an electrochemical cell for target ion destruction, comprising: interrupting a current passing between an anode and a cathode of the electrochemical cell during a target ion destruct cycle, wherein a target ion rich water containing a target ion for destruction is in contact with the anode or the cathode, and wherein the target ion is destroyed.

In another aspect of the present invention, there is provided a process for removing a target ion from a for-treatment water containing the target ion, wherein the target ion is nitrate; comprising: (a) passing a nitrate rich water through an electrochemical cell comprising an anode and a cathode, and (b) passing a current between the anode and the cathode; wherein nitrate is destroyed during a destruct cycle producing a nitrate depleted water, wherein the current is periodically interrupted during the destruct cycle while the nitrate rich water is passing through the electrochemical cell, wherein the nitrate rich water is passed through the electrochemical cell over a cycle time; wherein the current is passed between the anode and the cathode over an on time; and wherein the on time is less than the cycle time.

In another aspect of the present invention, there is provided a process for removing a target ion from a for-treatment water containing the target ion comprising: i) an ion exchange loading cycle comprising passing the for-treatment water through an ion exchange column containing a target ion selective exchange resin to extract the target ion from the for-treatment water producing a product treated water; ii) a regeneration cycle comprising regenerating the ion exchange column by: a) passing a first aqueous regenerant solution with a first regenerant ion through the ion exchange column to remove ions held less strongly to the target ion selective exchange resin than the target ion; b) then passing a second aqueous regenerant solution with a second regenerant ion through the ion exchange column to remove the target ion from the target ion selective exchange resin producing a target ion rich water; and, c) then rinsing the ion exchange column with a third aqueous regenerant solution; and, iii) a destruct cycle comprising passing the target ion rich water through an electrochemical cell comprising an anode and a cathode and passing a current between the anode and the cathode, wherein the current is interrupted at least once while the target ion rich water is passing through the electrochemical cell and wherein the target ion is destroyed producing a target ion depleted water.

DETAILED DESCRIPTION

Figure 1:
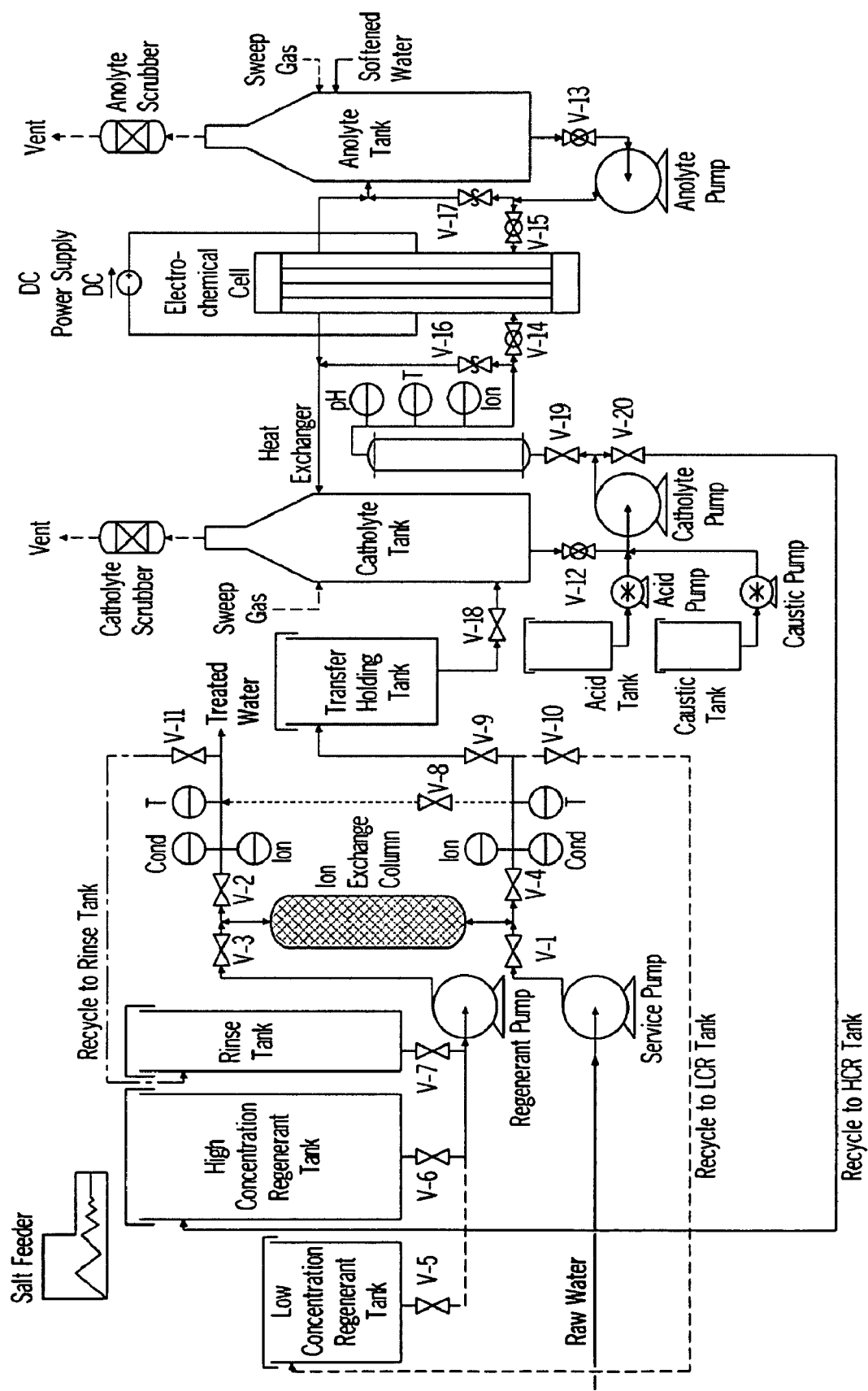
FIG. 1 is a schematic diagram of one embodiment of a water treatment system of the present invention.

The term "cycle time" as used herein and in the appended claims refers to the period during which a target rich water is passed through or retained in the electrochemical cell.

The term "on-time" as used herein and in the appended claims refers to the period during which the anode and the cathode of the electrochemical cell are maintained at different electrical potentials.

The term "Bed volume or BV" as used herein and in the appended claims refers to the volume of solution required to fill the same space occupied by the ion exchange resin loaded into a given ion exchange column, including internal and interstitial voids.

The term "target ion destruct rate" as used herein and in the appended claims relative to a given electrochemical cell is the quantity of the target ion destroyed per unit time in the electrochemical cell. Typical units for target ion destruct rate are g/hr.

The term "electrode efficiency" as used herein and in the appended claims is the target ion destruct rate divided by the active area of the electrodes in a given electrochemical cell. Typical units of electrode efficiency are $g/hr/m^2$.

The term "current efficiency" as used herein and in the appended claims is the target ion destruct rate divided by the current applied to the electrochemical cell. Typical units of current efficiency are g/hr/A.

The term "loading cycle" as used herein and in the appended claims is a water treatment process step of the present invention in which a for-treatment water containing a target ion is passed through an ion exchange column, wherein the target ion is extracted from the for-treatment water producing a treated water.

The term "regeneration cycle" as used herein and in the appended claims is a water treatment process step of the present invention in which an ion exchange column containing an ion exchange resin, exhausted following a loading cycle, is regenerated.

The term "destruct cycle" as used herein and in the appended claims is a water treatment process step of the present invention in which a target ion present in a target ion rich water is electrochemically destroyed in an electrochemical cell producing a target ion depleted water.

In some embodiments, the process for removing a target ion from a for-treatment water containing the target ion provides the partial or complete removal of the target ion from the for-treatment water. In some aspects of these embodiments, the target ion is selected from electrochemically reducible anions including, for example, nitrate, nitrite, perchlorate, chlorate and combinations thereof. In some aspects of these embodiments, the initial target ion concentration in the for-treatment water is 0.001 to 1000 mg/L. In some aspects of these embodiments, the initial target ion concentration in the for-treatment water is 1 to 1,000 mg/L. In some aspects of these embodiments, the initial target ion concentration in the for-treatment water is >50 mg/L. In some aspects of these embodiments, the concentration of the target ion in the treated water produced is <40 mg/L. In some aspects of these embodiments, the concentration of the target ion in the treated water produced is <10 mg/L. In some aspects of these embodiments, the initial target ion concentration in the for-treatment water is 0.001 to 1 mg/L. In some aspects of these embodiments, the initial target ion concentration in the for-treatment water is >0.010 mg/L. In some aspects of these embodiments, the concentration of the target ion in the treated water produced is <0.001 mg/L. In some aspects of these embodiments, the target ion is nitrate and the initial concentration of nitrate in the for-treatment water is 10 to 1000 mg/L. In some aspects of these embodiments, the target ion is nitrate and the initial target ion concentration in the for-treatment water is 50 to 1000 mg/L. In some aspects of these embodiments, the target ion is nitrate and the initial concentration of the target ion in the for-treatment water is >50 mg/L. In some aspects of these embodiments, the target ion is nitrate and the concentration of the target ion in the treated water produced <40 mg/L. In some aspects of these embodiments, the target ion is nitrate and the concentration of the target ion in the treated water produced is <25 mg/L. In some aspects of these embodiments, the target ion is nitrate and the concentration of the target ion in the treated water produced is <10 mg/L.

In some embodiments of the present invention, the process for removing a target ion from a for-treatment water containing the target ion, comprises a destruct cycle, wherein the target ion is destroyed in the destruct cycle by any electrochemical method suitable for that purpose. In some aspects of these embodiments, the target ion is destroyed using a two-compartment electrochemical cell equipped with a cation-exchange membrane. In some aspects of these embodiments, the cathode surface is selected from graphite, platinum, platinized titanium, titanium, lead, nickel, copper, ruthenium, rhodium, stainless steel and combinations thereof. In some aspects of these embodiments, the anode surface is selected from graphite, platinum, platinized titanium, titanium, lead, nickel, niobium, copper, iridium, iridium oxide, ruthenium, rhodium, stainless steel and combinations thereof.

In some embodiments of the present invention, the process for removing a target ion from a for-treatment water containing the target ion, comprises a destruct cycle comprising: (a) passing a target ion rich water through an electrochemical cell comprising an anode and a cathode, and (b) passing a current between the anode and the cathode; wherein the target ion is destroyed during a destruct cycle producing a water depleted in the target ion, wherein the current is periodically interrupted during the destruct cycle while the target ion rich water is passing through the electrochemical cell and wherein the target ion is selected from electrochemically reducible anions including, but not limited to, nitrate, nitrite, perchlorate, chlorate, and any combinations thereof. In some aspects of these embodiments, the target ion rich water continues to flow through the electrochemical cell during the current interruption period. The number and duration of the interruption periods per destruct cycle can be modified to optimize a given process. In some aspects of these embodiments, the current is interrupted multiple times during a destruct cycle. In some aspects of these embodiments, the current is interrupted in a periodic fashion during a destruct cycle. An example of a periodic fashion could be on for 60 minutes, off for 3 seconds; on for 60 minutes, off for 3 seconds; etc. In some aspects of these embodiments, the current is interrupted in a non-periodic fashion. An example of a non-periodic fashion could be on for 60 minutes, off for 0.5 seconds; on for 60 minutes, off for 1 second; on for 60 minutes, off for 1.5 seconds, etc. In some aspects of these embodiments, the current is periodically interrupted during the destruct cycle while the target ion rich water is passing through the electrochemical cell, wherein the target ion rich water is passed through the electrochemical cell over a cycle time; wherein the current is passed between the anode and the cathode over an on time; and wherein the on time is less than the cycle time. In some aspects of these embodiments, the on time is ≦99.99% of the cycle time. In some aspects of these embodiments, the on time is ≦99% of the cycle time. In some aspects of these embodiments, the on time is ≦98% of the cycle time. In some aspects of these embodiments, the on time is ≦95% of the cycle time. In some aspects of these embodiments, the on time is 99% to 99.99% of the cycle time. In some aspects of these embodiments, the on time is 95% to 99.99% of the cycle time. In some aspects of these embodiments, the target ion is selected from electrochemically reducible anions including, but not limited to, nitrate, nitrite, perchlorate, chlorate, and any combinations thereof. In some aspects of these embodiments, the target ion is nitrate. In some aspects of these embodiments, the concentration of the target ion in the target ion depleted water exiting the electrochemical cell is less than the concentration of the target ion in the target ion rich water entering the electrochemical cell. In some aspects of these embodiments, the target ion is nitrate and the concentration of the target ion in the target ion depleted water exiting the electrochemical cell is <500 mg/L. In some aspects of these embodiments, the target ion is nitrate and the concentration of the target ion in the target ion depleted water exiting the electrochemical cell is <250 mg/L. In some aspects of these embodiments, the target ion is nitrate and the concentration of the target ion in the target ion depleted water exiting the electrochemical cell is <100 mg/L.

In some embodiments of the present invention, the process for removing a target ion from a for-treatment water containing the target ion, comprises a destruct cycle, wherein the destruct cycle results in the destruction of the target ion present in a target ion rich water. In some aspects of these embodiments $\geq 90$ wt % of the target ion present in the target ion rich water is destroyed during the destruct cycle. In some aspects of these embodiments $\geq 95$ wt % of the target ion present in the target ion rich water is destroyed during the destruct cycle. In some aspects of these embodiments $\geq 99$ wt % of the target ion present in the target ion rich water is destroyed during the destruct cycle.

In some embodiments of the present invention, the electrochemical cell is a two compartment electrochemical cell having a cathodic compartment and an anodic compartment with a membrane separating the two compartments. In some aspects of these embodiments, the anodic compartment contains an anolyte solution and the cathodic compartment contains a catholyte solution and the main role of the membrane is to isolate the catholyte solution from the anolyte solution. Hence, both compartments can have a solution with a different composition, optimized for the chemical reactions desired for each compartment. In some aspects of these embodiments, the membrane is selected to control the flow of ions from one compartment to the other. In some aspects of these embodiments, the membrane is selected from cation exchange membranes. When using a cation exchange membrane, the primary charge carrier between the anodic compartment and the cathodic compartment is $H^+$. In some aspects of these embodiments, wherein the target ion is nitrate, proper selection of the cation exchange membrane facilitates the minimization of the transfer of unwanted anions, such as $NO_3^-$, $HCO_3^-$ and/or $Cl^-$ from the cathodic compartment to the anodic compartment. By keeping the nitrate containing catholyte solution away from the anode, re-oxidation of the intermediates and the products of the nitrate reduction process is prevented. By keeping any $Cl^-$ ions in the catholyte solution away from the anode, chlorine evolution at the surface of the anode is prevented. Also, appropriate selection of the membrane helps to prevent migration of oxidative species to the catholyte solution, which could cause damage to the target ion selective exchange resin upon contact therewith in those embodiments in which the catholyte solution is recycled for use as a regenerant solution.

In some embodiments of the present invention, the process for removing a target ion from a for-treatment water containing the target ion, further comprises an ion exchange loading cycle and a regeneration cycle.

In some embodiments of the present invention, the ion exchange loading cycle comprises passing a for-treatment water containing a target ion through an ion exchange column containing a bed of a target ion selective exchange resin, wherein the target ion is extracted from the for-treatment water producing a product treated water. In some aspects of these embodiments, the target ion selected from electrochemically reducible anions including, for example, nitrate, nitrite, perchlorate, chlorate and combinations thereof. In some aspects of these embodiments, the target ion is nitrate.

In some embodiments of the present invention, the process for removing a target ion from a for-treatment water containing the target ion, comprises a loading cycle wherein a target ion selective exchange resin is used to extract the target ion from the for-treatment water during the ion exchange cycle. Target ion selective exchange resins are ion exchange resins that exhibit a higher affinity for the target ion than for other ions present in the for-treatment water. For example, a nitrate selective exchange resin is an ion exchange resin that exhibits a higher affinity for nitrate than for other major anions (a.k.a. "non-target ions") typically present in for-treatment waters. The use of a target ion selective exchange resin helps (a) to increase the operating capacity of the ion exchange process particularly in those situations where the ratio of non-target ions to the target ion in the for-treatment water is high; (b) to reduce the adsorption of non-target ions to the ion exchange resin; and (c) to decrease the accumulation of non-target ions in any recycled regenerant solutions. Notwithstanding, one of ordinary skill in the art will recognize that even target ion selective exchange resins have an affinity for more than just the target ion and will extract such non-target ions from the for-treatment water contacting the resin. For-treatment water often contains multiple different ions. For example, in a process for removing nitrate from a for-treatment water, it is noted that for-treatment waters containing $NO_3^-$ also typically contain $SO_4^{2-}$, $Cl^-$ and $HCO_3^-$. In particular, significant quantities of $SO_4^{2-}$ are often present in such for-treatment waters. These other ions are not electrochemically reduced under the same conditions typically used for $NO_3^-$ reduction. Accordingly, if these non-target ions are present in the nitrate rich water (a.k.a. "catholyte solution") fed to the electrochemical cell and the nitrate depleted water exiting the electrochemical cell is to be recycled for use as an aqueous regenerant solution in a subsequent regeneration cycle, these non-target ions will build up in the system. One skilled in the art will recognize that a build up of such ions in the system would be undesirable.

In some embodiments of the present invention, the regeneration cycle comprises regeneration of a bed of target ion selective exchange resin in an ion exchange column. In some aspects of these embodiments, the regeneration cycle is commenced once the target ion removal capacity of the bed of target ion selective exchange resin in the ion exchange column is exhausted. In some aspects of these embodiments, the bed is regenerated using one or more aqueous regenerant solutions. The aqueous regenerant solution(s) is (are) brought into contact with the target ion selective exchange resin, wherein ions adsorbed on the target ion selective exchange resin are replaced with ions present in the aqueous regenerant solution. In some aspects of these embodiments, the target ion is nitrate and at least one aqueous regenerant solution used in the regeneration cycle contains a regenerant ion selected from chloride, bicarbonate and combinations thereof, preferable chloride. As a result of the regeneration cycle, at least one aqueous regenerant solution is enriched in the target ion. In some aspects of these embodiments, the target ion is nitrate and at least one of the aqueous regeneration solutions is enriched with nitrate as a result of the regeneration process producing a nitrate rich water. In some aspects of these embodiments, the nitrate rich water is transferred to an electrochemical cell as a catholyte solution, wherein the nitrate is destroyed during a destruct cycle producing a nitrate depleted water.

In some embodiments of the present invention, the build up of non-target ions in the water treatment system is alleviated through the use of multiple aqueous regenerant solutions. In some aspects of these embodiments, at least two aqueous regenerant solutions are used for regenerating the ion exchange column in a regeneration cycle following a loading cycle in which a target ion is extracted from a for-treatment water using an ion exchange column containing a bed of target ion selective exchange resin. In some aspects of these embodiments, a first aqueous regenerant solution and a second aqueous regenerant solution are used for regenerating the bed of target ion selective exchange resin in the ion exchange column following a loading cycle. In some aspects of these embodiments, the first aqueous regenerant solution contains a first regenerant ion that removes ions held less strongly to the target ion selective exchange resin than the target ion. In some aspects of these embodiments, the second aqueous regenerant solution contains a second regenerant ion capable of displacing the target ion from the target ion selective exchange resin. In some aspects of these embodiments, the first regenerant ion and the second regenerant ion are the same, wherein the concentration of the first regenerant ion in the first aqueous regenerant solution is less than the concentration of the second regenerant ion in the second aqueous regenerant solution.

In some embodiments of the present invention, the build up of non-target ions in the water treatment system is alleviated through the use of multiple aqueous regenerant solutions. In some aspects of these embodiments, a first aqueous regenerant solution with a first regenerant ion is fed through the ion exchange column during a regeneration cycle to remove ions held less strongly to the target ion selective exchange resin than the target ion. In some aspects of these embodiments, a second aqueous regenerant solution with a second regenerant ion is fed through the ion exchange column following the first aqueous regenerant solution during a regeneration cycle to remove target ion from the target ion selective exchange resin. In some aspects of these embodiments, the second aqueous regenerant solution is rinsed from the ion exchange column during a regeneration cycle using a third aqueous regenerant solution (a.k.a. "rinse solution"). In some aspects of these embodiments, the third aqueous regenerant solution is for-treatment water or treated water. In some aspects of these embodiments, the first regenerant ion and the second regenerant ion are different ions. In some aspects of these embodiments, the first regenerant ion and the second regenerant ion are the same and the concentration of the first regenerant ion in the first aqueous regenerant solution is lower than the concentration of the second regenerant ion in the second aqueous regenerant solution.

In some embodiments of the present invention, all or a portion of the aqueous regenerant solution(s) exiting the ion exchange column during a regeneration cycle is(are) recycled for use in a subsequent regeneration cycle. In some aspects of these embodiments, multiple aqueous regenerant solutions are used. In some aspects of these embodiments, a first aqueous regenerant solution, a second aqueous regenerant solution and a third aqueous regenerant solution (a.k.a. "rinse solution") are fed to the ion exchange column during a regeneration cycle. In some aspects of these embodiments, the first aqueous regenerant solution and the second aqueous regenerant solution contain different concentrations of the same regenerant ion, wherein the concentration of that regenerant ion is higher in the second aqueous regenerant solution. In some aspects of these embodiments, all or a portion of the second aqueous regenerant solution exiting the ion exchange column is fed to an electrochemical cell as a catholyte solution. In some aspects of these embodiments, all or a portion of the first aqueous regenerant solution exiting the ion exchange column is directed to the sewer or blended with the treated water. In some aspects of these embodiments, all or a portion of the third aqueous regenerant solution exiting the ion exchange column is recycled for use in a subsequent regeneration cycle as the first aqueous regenerant solution. In some aspects of these embodiments, the portion of the third aqueous regenerant solution exiting the ion exchange column is treated to set the concentration of regenerant ions therein before it is recycled for use in a subsequent regeneration cycle as the first aqueous regenerant solution. In some aspects of these embodiments, the third aqueous regenerant solution exiting the ion exchange column is treated to raise the concentration of regenerant ions therein. In some aspects of these embodiments, the third aqueous regenerant solution exiting the ion exchange column is treated to reduce the concentration of regenerant ions therein. In some aspects of these embodiments, the volume of the third aqueous regenerant solution exiting the ion exchange column that is recycled for use as the first aqueous regenerant solution in a subsequent regeneration cycle equals at least 90 vol % of the total volume of the first aqueous regenerant solution exiting the ion exchange column that is not recycled for use as the first aqueous regenerant solution in a subsequent regeneration cycle.

In some embodiments of the present invention, the process for removing a target ion from a for-treatment water containing the target ion comprises: i) an ion exchange loading cycle comprising passing the for-treatment water through an ion exchange column containing a target ion selective exchange resin to extract the target ion from the for-treatment water producing a treated water; ii) a regeneration cycle comprising regenerating the ion exchange column by: a) passing a first aqueous regenerant solution with a first regenerant ion through the ion exchange column to remove ions held less strongly to the target ion selective exchange resin than the target ion; b) then passing a second aqueous regenerant solution with a second regenerant ion through the ion exchange column to remove the target ion from the target ion selective exchange resin producing a target ion rich water; c) then rinsing the ion exchange column with a third aqueous regenerant solution to flush the second aqueous regenerant solution from the ion exchange column and to remove excess regenerant ions from the ion exchange column; iii) a destruct cycle comprising passing the target ion rich water through an electrochemical cell comprising an anode and a cathode and passing a current between the anode and the cathode, wherein the target ion is destroyed producing a target ion depleted water, wherein the current is interrupted at least once while the target ion rich water is passing through the electrochemical cell. In some aspects of these embodiments, the target ion depleted water exiting the electrochemical cell is treated to replenish the concentration of regenerant ions therein before it is recycled back to the ion exchange column for use as the second aqueous regenerant solution in a subsequent regeneration cycle.

The choice of regenerant ion used in the aqueous regenerant solutions is dependent on the target ion and the selectivity of the ion exchange resin used. In some embodiments of the present invention, the target ion is nitrate and the regenerant ion used in at least one aqueous regenerant solution is selected from bicarbonate, chloride, sulfate and combinations thereof, preferably chloride.

In some embodiments of the present invention, an aqueous acid and/or an aqueous base is added to the target ion rich water in the electrochemical cell (a.k.a. "the catholyte solution") to maintain the pH of that solution. The addition of aqueous acid and/or aqueous base to the target ion rich water operates to increase the volume of this solution and the volume of the target ion depleted water exiting the electrochemical cell. Further, in some aspects of these embodiments, there is a net flow of water from the anolyte solution to the catholyte solution in the electrochemical cell during the destruct cycle. In some aspects of these embodiments, water is produced during the target ion destruct cycle in the catholyte solution. In those embodiments wherein the target ion depleted water is recycled to the ion exchange portion of the water treatment system for use as an aqueous regenerant solution, it is desirable to minimize the increase in volume of the catholyte solution. In some embodiments of the present invention, at least some of the water added to the catholyte solution during a destruct cycle is removed through enhanced evaporation. In some aspects of these embodiments, the enhanced evaporation is facilitated by passing a sweep gas through the head space above the catholyte solution. In some aspects of these embodiments, the enhanced evaporation is facilitated by passing a sweep gas through the catholyte solution. In some aspects of these embodiments, the enhanced evaporation is facilitated by sparging a sweep gas into the catholyte solution. In some aspects of these embodiments, at least 90 vol % of the water added to the catholyte solution during a destruct cycle is removed through enhanced evaporation. In some aspects of these embodiments, at least 95 vol % of the water added to the catholyte solution during a destruct cycle is removed through enhanced evaporation. In some aspects of these embodiments, 90 to 100 vol % of the water added to the catholyte solution during the destruct cycle is removed through enhanced evaporation. In some aspects of these embodiments, 95 to 100 vol % of the water added to the catholyte solution during the destruct cycle is removed through enhanced evaporation. In some aspects of these embodiments, the sweep gas is treated to remove one or more components (e.g., ammonia) before it is released to the atmosphere. In some aspects of these embodiments, the sweep gas is air or an inert gas such as nitrogen.

In some embodiments of the present invention, the for-treatment water is ground water or surface water.

In some embodiments of the present invention, the target ion rich water is the for-treatment water. In some aspects of these embodiments, the treated water is the target ion depleted water.

In some embodiments of the present invention, the target ion rich water is produced during a regeneration cycle, wherein a bed of target ion selective exchange resin is regenerated, wherein the target ion rich water is a spent aqueous regenerant solution exiting the ion exchange column during a regeneration cycle.

The water treatment systems of the present invention will now be described in further detail herein for water treatment systems in which the target ion is nitrate. One of ordinary skill in the art given the teachings provided herein will know how to modify the described nitrate target ion water treatment systems for use with other target ions, including for example, nitrite, perchlorate, chlorate and combinations thereof.

In some embodiments of the present invention, the process for removing nitrate from a for-treatment water containing nitrate, comprises an ion exchange loading cycle, a regeneration cycle and a destruct cycle. In some aspects of these embodiments, the ion exchange loading cycle comprises passing the for-treatment water through a nitrate selective ion exchange column containing a bed of nitrate selective exchange resin, wherein nitrate is extracted from the for-treatment water producing a product treated water. Two commercially available nitrate selective exchange resins suitable for use with the present invention are IMAC™ HP555 from Rohm and Haas Company and A520E from Purolite International. The relative affinities of these commercially available nitrate selective exchange resins for anions typically present in for-treatment water are:

$$NO_3^- > SO_4^{2-} > Cl^- > HCO_3^- \qquad (1)$$

In some embodiments of the present invention, there is provided a process for removing nitrate from a for-treatment water containing nitrate comprising: i) an ion exchange loading cycle comprising passing the for-treatment water through an ion exchange column containing a nitrate selective ion exchange resin to extract nitrate from the for-treatment water producing a product treated water; ii) a regeneration cycle comprising regenerating the ion exchange column by: a) passing a first aqueous regenerant solution with a first regenerant ion through the ion exchange column to remove ions held less strongly to the nitrate selective exchange resin than nitrate; b) then passing a second aqueous regenerant solution with a second regenerant ion through the ion exchange column to remove the nitrate from the nitrate selective exchange resin producing a nitrate rich water; c) then rinsing the ion exchange column with a third aqueous regenerant solution to flush the second aqueous regenerant solution from the ion exchange column and to remove excess regenerant ions from the ion exchange column; iii) a destruct cycle comprising passing the nitrate rich water (a.k.a. "catholyte solution") through an electrochemical cell comprising an anode and a cathode and passing a current between the anode and the cathode, wherein the nitrate is destroyed producing a nitrate depleted water, wherein the current is interrupted at least once while the nitrate rich water is passing through the electrochemical cell. In some aspects of these embodiments, the nitrate depleted water exiting the electrochemical cell is treated to replenish the concentration of regenerant ions therein before it is recycled back to the ion exchange column for use as the second aqueous regenerant solution in a subsequent regeneration cycle.

The overall chemical reaction for the electrochemical reduction of nitrate to nitrogen or ammonia within the cathodic compartment is described as:

$$NO_3^- + 6H^+ + 5e^- \rightarrow \tfrac{1}{2}N_2 + 3H_2O \qquad (2)$$

$$NO_3^- + 9H^+ + 8e^- \rightarrow NH_3 + 3H_2O \qquad (3)$$

with any ammonia in equilibrium with ammonium ion

$$NH_3 + H^+ \rightleftharpoons NH_4^+ \qquad (4)$$

A side reaction that can occur within the cathodic compartment is hydrogen evolution

$$2H^+ + 2e^- \rightarrow H_2 \qquad (5)$$

The exact mechanism for nitrate reduction involves many steps and intermediate species. It is postulated that the first stable intermediate in the process is nitrite

$$NO_3^- + 2H^+ + 2e^- \rightarrow NO_2^- + H_2O \qquad (6)$$

However, the embodiments of the present invention are not dependent on specific models or mechanisms for the overall reactions.

In some embodiments of the present invention the anolyte in the electrochemical cell contains sulphuric acid. In some aspects of these embodiments, the main reaction in the anodic compartment is water electrolysis, oxygen evolution and proton generation:

$$2H_2O \rightarrow O_2 + 4H^+ + 4e^- \quad (7)$$

A side reaction that could occur in the anodic compartment is the electrochemical oxidation of any $Cl^-$ ions present to chlorine gas $$2Cl^- \rightarrow Cl_2 + 2e^- \quad (8)$$

Nominally, one $H^+$ will be generated at the anode and migrate through the cation exchange membrane into the cathodic compartment for each $e^-$ that passes through the exchange membrane, as described by reaction 7. However, as indicated in reactions 2-3, the overall cathodic reactions consume one more $H^+$ than $e^-$. Therefore, the catholyte solution will be depleted of $H^+$ as $NO_3^-$ is reduced and the pH of the catholyte solution will increase unless additional $H^+$ is added. $H^+$ is typically added to the catholyte solution in the form of an aqueous acid solution. The addition of aqueous acid to the catholyte solution results in an increase in the volume of the catholyte solution. Also, as $H^+$ migrates through the cation exchange membrane it brings with it $H_2O$ molecules by the process of electro-osmosis. Typically, at least one $H_2O$ will be carried through the exchange membrane by electro-osmosis for each $H^+$ transported from the anolyte to the catholyte solution, further increasing the volume of the catholyte solution. As shown in reactions 2-3, 3 $H_2O$ molecules are also formed for each $NO_3^-$ that is destroyed during a destruct cycle, further increasing the volume of the catholyte solution. In those embodiments where the catholyte solution is recycled as an aqueous regenerant solution for use in a subsequent regeneration cycle, it is desirable to minimize the increase in volume of the catholyte solution (i.e., to minimize the size of, and investment in, the equipment needed to contain the subject solutions and to minimize the volume of water discarded). In some embodiments of the present invention, enhanced evaporation facilitated by the use of a sweep gas is implemented to remove at least some of the water added to the catholyte solution during the destruct process.

One of ordinary skill in the art will recognize that reactions 2-8 are written for acidic solutions. One of ordinary skill in the art will also recognize how to write equivalent chemical reactions for basic solutions.

The theoretical maximum current efficiency for a given electrochemical cell ion destruct system can be determined based on chemical stoichiometry. For an electrochemical cell $NO_3^-$ ion destruct system in which the $NO_3^-$ is reduced to $N_2$, the theoretical efficiency can be derived from reaction 2. The theoretical current efficiency for such an electrochemical cell $NO_3^-$ destruct system is 0.463 g/hr/A. Similarly, if the product is $NH_3$, then the theoretical efficiency derived from reaction 3 is 0.289 g/hr/A.

To help illustrate certain aspects of the present invention, the operation of the water treatment system depicted in FIG. 1 for use in the removal of nitrate from a for-treatment water containing nitrate will be described herein in detail. The water treatment system depicted in FIG. 1 includes both an ion exchange portion and an electrochemical cell portion (a.k.a. "destruct system").

Figure 2:
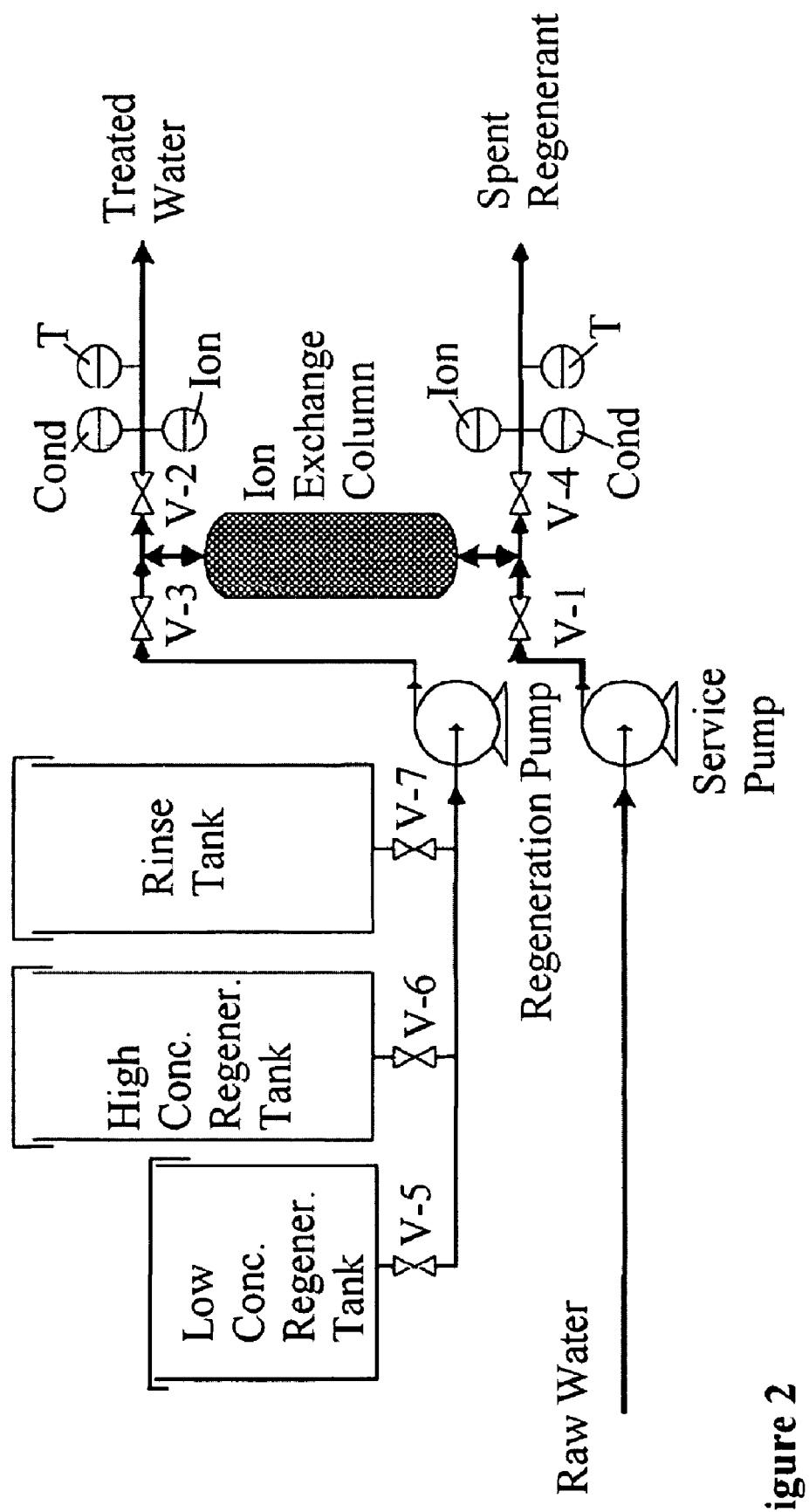
FIG. 2 is a schematic diagram of one embodiment of an ion exchange portion of a water treatment system of the present invention.
Figure 3:
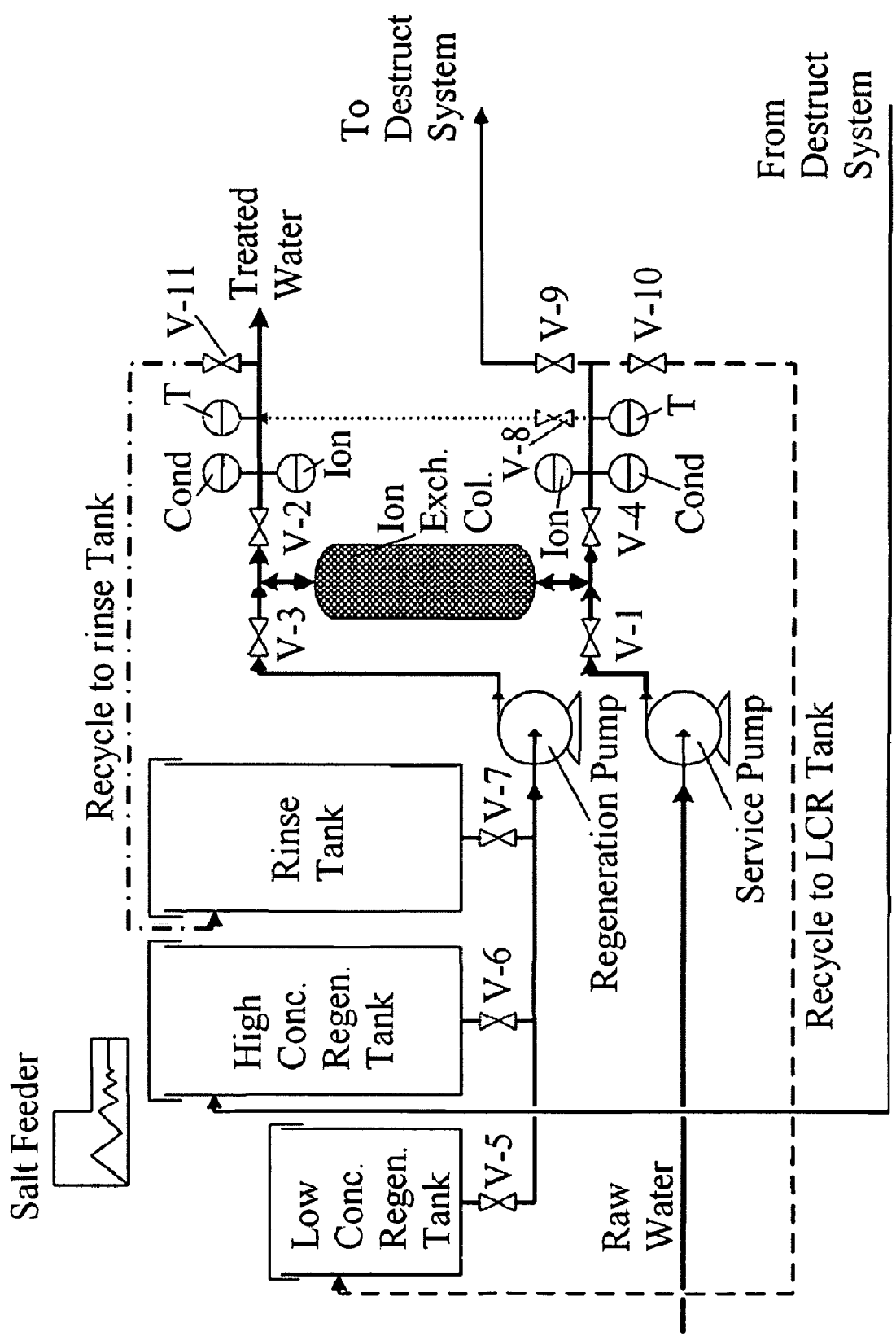
FIG. 3 is a schematic diagram of one embodiment of an ion exchange portion of a water treatment system of the present invention.

An ion exchange portion of an exemplary water treatment system of the present invention is depicted in FIGS. 1-3. During an ion exchange loading cycle, the for-treatment water is pumped through inlet valve V-1 and through the ion exchange column. The treated water passes out of the ion exchange column through outlet valve V-2. Any necessary sensors for process monitoring and control can be placed in the outlet line from the ion exchange column. Such sensors may include sensors for temperature, pH, conductivity, and target ion concentration. Valves V-3 and V-4 are typically kept closed during the loading cycle.

During a regeneration cycle, at least one aqueous regenerant solution is passed through the ion exchange column. The at least one aqueous regenerant solution is pumped through inlet valve V-3 and through the ion exchange column. The spent regenerant solution exiting the ion exchange column passes through outlet valve V-4. Any necessary sensors for process monitoring and control can be placed in the outlet line from the ion exchange column. Such sensors may include sensors for temperature, pH, conductivity, and target ion concentration. Valves V-1 and V-2 are kept closed during the regeneration cycle.

One of ordinary skill in the art will recognize that the water flow direction through the ion exchange column during an ion exchange loading cycle can be up-flow, down-flow or a combination thereof. One of ordinary skill in the art will also recognize that the flow direction through the ion exchange column during the resin regeneration cycle can be up-flow, down-flow or a combination thereof. One of ordinary skill in the art will further recognize that the flow direction for a regeneration cycle can be co-current, counter-current or a combination of co-current and counter-current relative to the flow direction for a loading cycle.

The water treatment system depicted in FIGS. 1-3 is designed for use with three regenerant solutions, namely a first aqueous regenerant solution (a.k.a. "low concentration regenerant solution"), a second aqueous regenerant solution (a.k.a. "high concentration regenerant solution"), and a third aqueous regenerant solution (a.k.a. "rinse solution"). The first aqueous regenerant solution and the second aqueous regenerant solution contain the same regenerant ion, with the first aqueous regenerant solution having a lower concentration of the regenerant ion as compared to the second aqueous regenerant solution. In operation, the low concentration regenerant solution is supplied to the regenerant pump by opening valve V-5, with valves V-6 and V-7 closed. By appropriate choice of the regenerant concentration in the low concentration regenerant solution, when charged to the ion exchange column following a loading cycle, the low concentration regenerant solution will displace ions that are more weakly held by the exchange resin than nitrate (a.k.a. "non-target ions"). That is, for example, a low concentration solution of $Cl^-$ will displace $HCO_3^-$ and $SO_4^{2-}$ preferentially, leaving $NO_3^-$ behind on the ion exchange resin. In some embodiments of the present invention, NaCl is used as the regenerant, wherein the regenerant concentration for the low concentration regenerant solution fed to the ion exchange column is <50 g/L of solution, preferably $\geq 10$ to $\leq 40$ g/L of solution, more preferably $\geq 20$ to $\leq 30$ g/L of solution. The low concentration regenerant solution is fed to the ion exchange column until the desired quantity of regenerant has been supplied. One of ordinary skill in the art will recognize that the optimum regenerant concentration in the low concentration regenerant solution depends on, inter alia, the ion exchange resin used, the non-target ions present, the target-ion, and the regenerant used.

The high concentration regenerant solution is supplied to the regenerant pump by opening valve V-6, with valves V-5 and V-7 closed. By appropriate choice of the regenerant concentration in the high concentration regenerant solution, when charged to the ion exchange column following a loading cycle and following the low concentration regenerant solution feed, the high concentration regenerant solution will displace the nitrate from the ion exchange resin in the ion exchange column. That is, if one is using a nitrate selective resin that has been loaded with $NO_3^-$, a high concentration of $Cl^-$ will displace the $NO_3^-$. In some embodiments of the present invention, NaCl is used as the regenerant, wherein the regenerant concentration for the high concentration regenerant solution fed to the ion exchange column is >50 g/L of solution, preferably ≧100 g/L of solution, more preferably ≧150 g/L of solution. The high concentration regenerant solution is fed to the ion exchange column until the desired quantity of regenerant has been supplied. One of ordinary skill in the art will recognize that the optimum regenerant concentration in the high concentration regenerant solution depends on, inter alia, the ion exchange resin used, the non-target ions present, the target-ion, and the regenerant used.

The rinse solution is supplied to the regenerant pump by opening valve V-7, with valves V-5 and V-6 closed. The rinse solution displaces the high concentration regenerant solution from the ion exchange column, leaving the bed in a regenerated state ready for another ion exchange loading cycle. The rinse solution can be for-treatment water. Alternatively, the rinse solution can be treated water recycled from the ion exchange column to the rinse tank during a previous loading cycle by opening valve V-11.

The use of three regenerant solutions fed to the ion exchange column during a regeneration cycle will lead to several regimes in the concentration profiles in the spent regenerant. Initially, the for-treatment water remaining in the ion exchange column from a previous loading cycle is displaced. This is followed by a period in which the weakly held non-target ions are present in the spent regenerant at a concentration higher than those of the regenerant ion or the target ion. This is followed by a period in which the concentration of the regenerant ion is present at a high value, the concentration of the target ion increases to a maximum and then decreases, while the concentration of weakly held non-target ions decrease rapidly. Which is followed by a period in which the concentrations of all species rapidly decrease as the regenerant is rinsed out of the bed. One of ordinary skill in the art will recognize that the details of the concentration profiles of the spent regenerant depend on, inter alia, the ion exchange resin used, the non-target ions present and their quantity, the target-ion and its quantity, and the concentration, purity, and volume of the three regenerant solutions. One of ordinary skill in the art will also appreciate that a change in the solution fed to the ion exchange column does not lead to a simultaneous change in the spent regenerant coming from the ion exchange column, due to the volume of solution in the piping, the interstitial voidage of the ion exchange resin bed (the latter approximately 0.35 BV), as well as diffusion and dispersion within the system.

In some embodiments of the present invention, the spent regenerant solution is partitioned into fractions. In some embodiments of the present invention, at least one of the spent regenerant fraction is recycled. In some aspects of these embodiments, the spent regenerant is partitioned into three effluent fractions, namely a first effluent fraction, a second effluent fraction and a third effluent fraction. The first effluent fraction contains the displaced for-treatment water as well as weakly held non-target ions, and relatively low concentrations of the regenerant and target ions. In some aspects of these embodiments, the first effluent fraction is discarded (e.g., discharged to the sewer). In some aspects of these embodiments, the first effluent fraction is blended with the treated water produced during a loading cycle. The second effluent fraction contains most of the target ion and a high concentration of the regenerant ion. In some aspects of these embodiments, the second effluent fraction is transferred as a target ion rich water for use as a catholyte solution in an electrochemical cell for a destruct cycle, wherein the target ion is destroyed forming a target ion depleted water. In some aspects of these embodiments, the catholyte solution following the destruct cycle (a.k.a. target ion depleted water) is recycled to the ion exchange column for use as a regenerant solution (e.g., as a high concentration regenerant solution). The third effluent fraction contains an intermediate concentration of the regenerant ion, a low concentration of the target ion, and negligible concentration of the weakly held non-target ions. In some aspects of these embodiments, the third effluent fraction is discarded (e.g., discharged to the sewer). In some aspects of these embodiments, the third effluent fraction is recycled to the ion exchange column for use as a regenerant solution (e.g., as a low concentration regenerant solution).

In some embodiments of the present invention, a first process solution is transferred from a first unit operation to a second unit operation (e.g., from an ion exchange column to an electrochemical cell) and a second process solution is recycled back to the first unit operation from the second unit operation. In some aspects of these embodiments, the first process solution is transferred and the second process solution is recycled multiple times over a plurality of water treatment cycles. In some aspects of these embodiments, the volume of the first process solution transferred from a first unit operation to a second unit operation is 95 to 105%, preferably 98 to 102%, more preferably 99 to 101%, of the volume of the second process solution recycled back to the first unit operation from the second unit operation.

Figure 4:
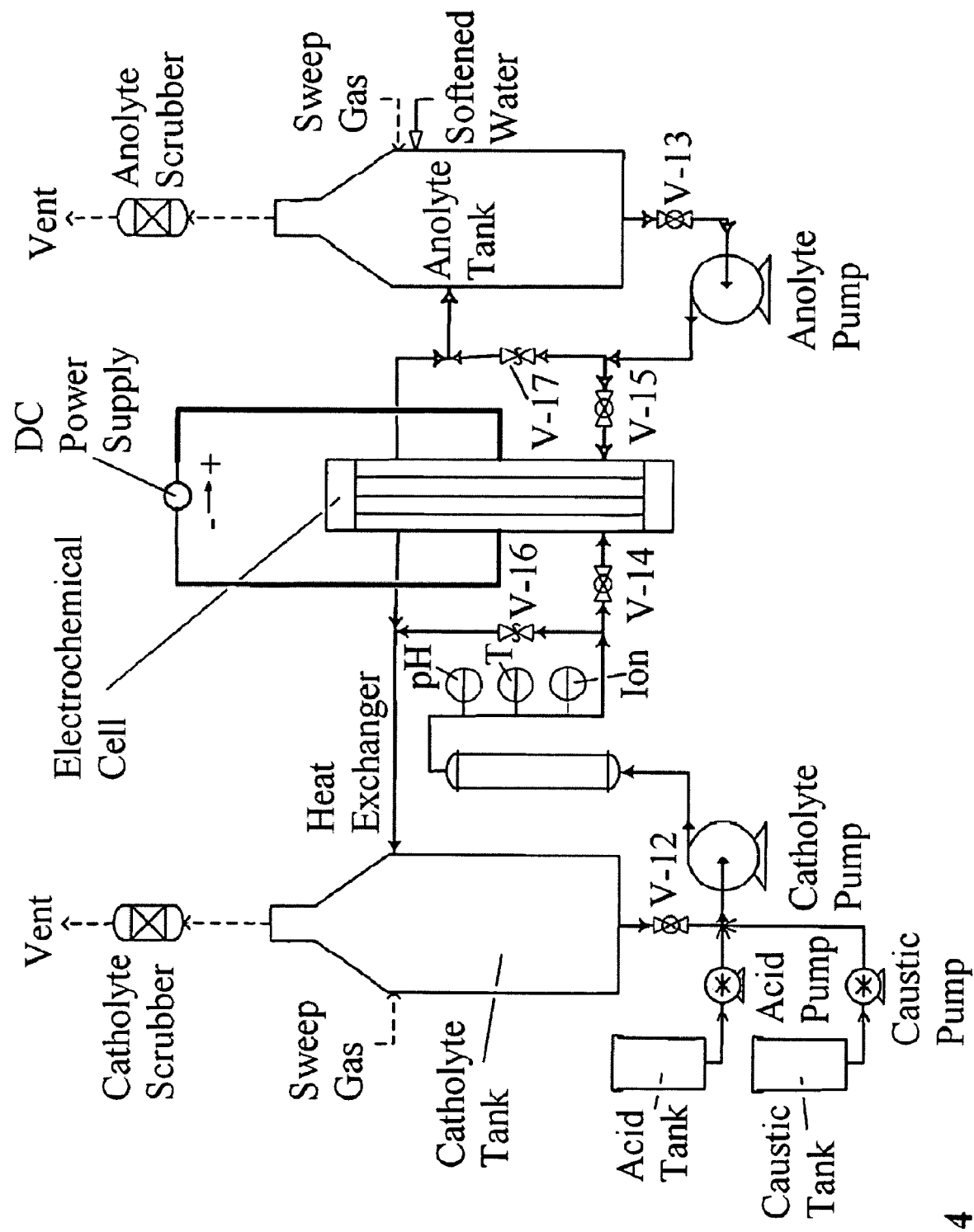
FIG. 4 is a schematic diagram of one embodiment of an electrochemical cell destruct system of the present invention.

An example of an electrochemical cell destruct system is depicted in FIG. 4. During a destruct cycle, the second stage effluent (a.k.a. "target ion rich water") is transferred to the catholyte storage tank where it is then used as the catholyte solution in an electrochemical cell. The catholyte solution is fed from the catholyte storage tank through valve V-12 and is pumped through valve V-14, through a cathodic compartment of a membrane divided electrochemical cell and back to the catholyte storage tank. Pressure regulating valve V-16 serves two purposes in the noted destruct system. First, if valve V-14 closes, it provides a path for the catholyte solution to circulate if the catholyte pump is on. Second, if valve V-14 is open, it helps to regulate the pressure within the electrochemical cell. An optional heat exchanger can be included in line between the catholyte pump and the electrochemical cell to regulate/control the temperature of the catholyte solution fed to the electrochemical cell. The amount of heat to be added or removed from the catholyte solution depends on a number of factors including the amount of electrical power supplied to the electrochemical cell, the efficiency of the electrochemical cell, the rate of heat loss to the environment and the safe operating range for the equipment used. Various sensors can be employed in line between the catholyte pump and the electrochemical cell for process monitoring and control, including, for example, temperature, pH, target ion concentration.

In a water treatment system with an electrochemical destruct system for destroying nitrate, it is often necessary to adjust the pH of the catholyte solution. Accordingly, in such a system it is desirable to provide apparatus for facilitating the addition of an acid or base to the catholyte solution. In systems where the target ion depleted water is reconstituted with NaCl, it is convenient to use HCl or NaOH to modify the pH of the catholyte solution. The desired pH for the catholyte solution will depend on the target ion being destroyed, the cathode material of construction, various side reactions that could take place, and materials of construction of the equipment used. For systems in which the target ion is nitrate in a brine solution, the pH is preferably >3 to minimize $H_2$ production in the electrochemical cell; more preferably $\geqq 9$ to facilitate the conversion of $NH_4^+$ to the more volatile $NH_3$; most preferably $\geqq 11$ to facilitate an increase in the $Cl_2$ solubility in the catholyte solution. Alternatively, a more neutral pH can be used so that the pH of the target ion depleted water recycled to the ion exchange portion of the water treatment system is $\leqq 9$; more preferably $\leqq 8$; most preferably 6.8 to 7.2.

The anolyte solution used in the electrochemical cell is handled by an arrangement similar to that used for the catholyte solution. The anolyte solution is contained within the anolyte tank. The anolyte solution passes through valve V-13 and is pumped through valve V-15, through an anodic compartment of the divided electrochemical cell, and back to the anolyte tank. Regulator valve V-17 regulates the pressure within the anodic compartment of the electrochemical cell. It is typically desirable to maintain pressure set points on valves V-16 and V-17 that are comparable to avoid a pressure differential across the membrane separating the anodic compartment from the cathodic compartment in the electrochemical cell. Though not shown in FIG. 4, a heat exchanger and process sensors can be incorporated in-line between the anolyte pump and the electrochemical cell.

The anolyte solution can be an aqueous acid, base, or salt solution. In some systems, the anolyte is an aqueous acid solution. In some systems, the anolyte solution is a non-halogen containing acid solution. In some systems, the anolyte solution is an aqueous $H_2SO_4$ solution with an $H_2SO_4$ concentration of between 10 and 20 wt %.

In a nitrate destruct system, the volume of the anolyte within the electrochemical destruct system will decrease with time. This loss in anolyte volume results from water electrolysis at the anode according to reaction 7 and the electro-osmosis transport of water through the membrane to the catholyte compartment. Accordingly, to maintain a stable volume of anolyte within the system, it is necessary to add water to the anolyte solution. In those systems wherein the anolyte solution is an aqueous $H_2SO_4$ solution, it is desirable to remove hardness ions such as, for example, $Ca^{2+}$ and $Mg^{2+}$ from the water to be added to the anolyte solution.

In a nitrate destruct system, the volume of the catholyte solution will increase over time through a combination of the water produced as a product of nitrate reduction (see reactions 2-3), electro-osmosis transport of water from the anolyte solution through the membrane, and the addition of aqueous acid thereto to maintain pH. If the catholyte solution is being recycled back to the high concentration regenerant tank it is desirable to minimize this increase in catholyte solution volume. It has been found that the use of a sweep gas can be an effective means for removing water from the catholyte solution. For example, a sweep gas can be passed through the air space above the catholyte solution in the catholyte storage tank to enhance the rate of evaporation from the catholyte solution. Alternatively, the sweep gas can be introduced directly into the catholyte solution by, for example, sparging. The sweep gas is then vented from the system along with water picked up from the catholyte solution. In some systems, it may be desirable to pass the sweep gas through a scrubber or other devices before releasing it to the atmosphere. The rate at which the sweep gas can remove water from the catholyte solution is a function of the sweep gas flow rate and the concentration of water vapor above the catholyte solution. The concentration of water vapor above the catholyte solution is related to the equilibrium vapor pressure of water, which is a function of the temperature of the catholyte solution. Accordingly, one of ordinary skill in the art given the teachings provided herein will know how to adjust the flow rate of the sweep gas and the temperature of the catholyte solution in the catholyte tank to control the rate of water removal from the catholyte solution by the sweep gas For example, the reduction of 1 mol of $NO_3^-$ to $N_2$, $NH_3$ or $NH_4^+$ in a NaCl catholyte solution will introduce approximately 11.4, 14.4, or 17.8 mol of $H_2O$ into the solution, respectively, from product water, electro-osmosis from the anolyte solution across the membrane, and the use of concentrated HCl to provide the additional $H^+$ needed to balance the electrochemical reactions. At 50° C., the vapor pressure of water is 0.122 atm, which by the ideal gas law implies that for a gas exiting the catholyte tank at 1 atm, 12.2% of the moles will be water vapor and 87.8% of the moles will be air. The volume of air corresponding to 1 mol at a pressure of 1 atm and a temperature of 20° C. is 24.0 L. Assuming 100% current efficiency to reduce $NO_3^-$ to $NH_3$, the estimated sweep gas (air) flow rate required to maintain the catholyte solution volume is approximately $$1\frac{C}{A \times s} \times 60\frac{s}{min} \times 14.4\frac{mol\ H_2O}{mol\ NO_3^-} \times \frac{\frac{0.878\ mol\ air}{0.212\ mol\ H_2O} \times 24.0\frac{L_{@20°\ C.\ 1\ atm}}{mol\ air}}{96485\frac{C}{mol\ e^{-1}} \times 8\frac{mol\ e^{-1}}{mol\ NO_3^-}} = 0.193\frac{L_{@20°\ C.\ 1\ atm}}{A \times min} \quad (9)$$

Therefore, a system utilizing a current of 12.5 A at 50° C. will require an estimated sweep gas (air) flow rate of approximately 2.4 L/min to remove the added volume of water from the catholyte solution. The actual sweep gas flow rate required will vary from the estimate based on the lowering of the vapor pressure due to the presence of salts in the catholyte solution, the efficiency of the electrochemical cell, the operating pH of the system, and the distribution of products of reaction in the electrochemical cell. In addition, evaporation facilitated by the sweep gas flow continues with the flow of the sweep gas, even when the electrochemical cell is idle.

As a further advantage, the sweep gas removes various products from the electrochemical reactions taking place in the electrochemical cell, for example, $NH_3$ produced during the reduction of $NO_3^-$ as well as $H_2$ that may be produced by side reactions in the electrochemical cell.

A sweep gas may optionally be passed through the anolyte side of the electrochemical destruct system. The primary objective for such an anolyte sweep gas is not water evaporation (as is the case for the catholyte sweep gas). Rather, the primary objective for use of an anolyte sweep gas is to remove various volatile products of anodic reactions occurring in the electrochemical cell, for example, anodic reactions can produce large quantities of $O_2$.

It may be desirable in certain installations to treat the sweep gases before venting to the atmosphere, for example by scrubbing. For example, in water treatment systems where the target ion is $NO_3^-$, the catholyte sweep gas may contain $NH_3$, which can be removed before venting by using an acidic scrubber; the anolyte sweep gas may contain trace quantities of $Cl_2$, which can be removed before venting by using a caustic scrubber. In some installations, the catholyte solution can be used to scrub the anolyte sweep gas and the anolyte solution can be used to scrub the catholyte sweep gas.

In some embodiments of the present invention, the process for removing a target ion from a for-treatment water containing the target ion further comprises a method for improving the efficiency of an electrochemical cell used in a destruct cycle for destroying the target ion. In some aspects of these embodiments, the method for improving the efficiency of the electrochemical cell comprises: interrupting a current passing between an anode and a cathode of the electrochemical cell during a destruct cycle, wherein the target ion is destroyed.

Some embodiments of the present invention will now be described in detail in the following examples.

Example 1

Ion Exchange and Regeneration with 1 Regenerant Solution

The apparatus used for Example 1 is depicted in FIG. 2. The ion exchange column used was a glass column (5.1 cm ID×45 cm long) filed with 875 mL of a nitrate selective exchange resin (IMAC™ HP555 from Rohm and Haas Company). The for-treatment water was a synthetic stream of 2.00 meq/L (71 mg/L) $Cl^-$, 1.5 meq/L (72 mg/L) $SO_4^{2-}$, 1.5 meq/L (93 mg/L) $NO_3^-$, 1.5 meq/L (92 mg/L) $HCO_3^-$, and 6.5 meq/L (150 mg/L) $Na^+$ in deionized water. The for-treatment water was fed to the column in an upflow direction at a rate of 583 mL/min (40 BV/hr) for a period of 6.5 hr (volume 260 BV) at which point the effluent $NO_3^-$ concentration was approximately 1.0 meq/L (62 mg/L). Concentrations and quantities given in terms of equivalents are with respect to ion exchange behavior (i.e., ionic valence, not electrochemical equivalents).

The nitrate selective exchange resin was regenerated using an aqueous regenerant solution containing regenerant chloride ions. Specifically, the aqueous regenerant solution had a NaCl concentration of 2.57 eq/L (150 g/L) and a volume of 933 mL (1.07 BV). This volume and concentration corresponds to a NaCl dose of 2.75 eq/L·resin (160 g/L·resin). The aqueous regenerant solution was fed to the ion exchange column in a downflow direction at a rate of 58.3 mL/min (4.0 BV/hr). The aqueous regenerant solution was then washed from the ion exchange column using 1,750 mL (2.0 BV) of a rinse solution having the same composition as the for-treatment water. The rinse solution was fed to the ion exchange column in a downflow direction at a rate of 58.3 mL/min (4.0 BV/hr).

Figure 5:
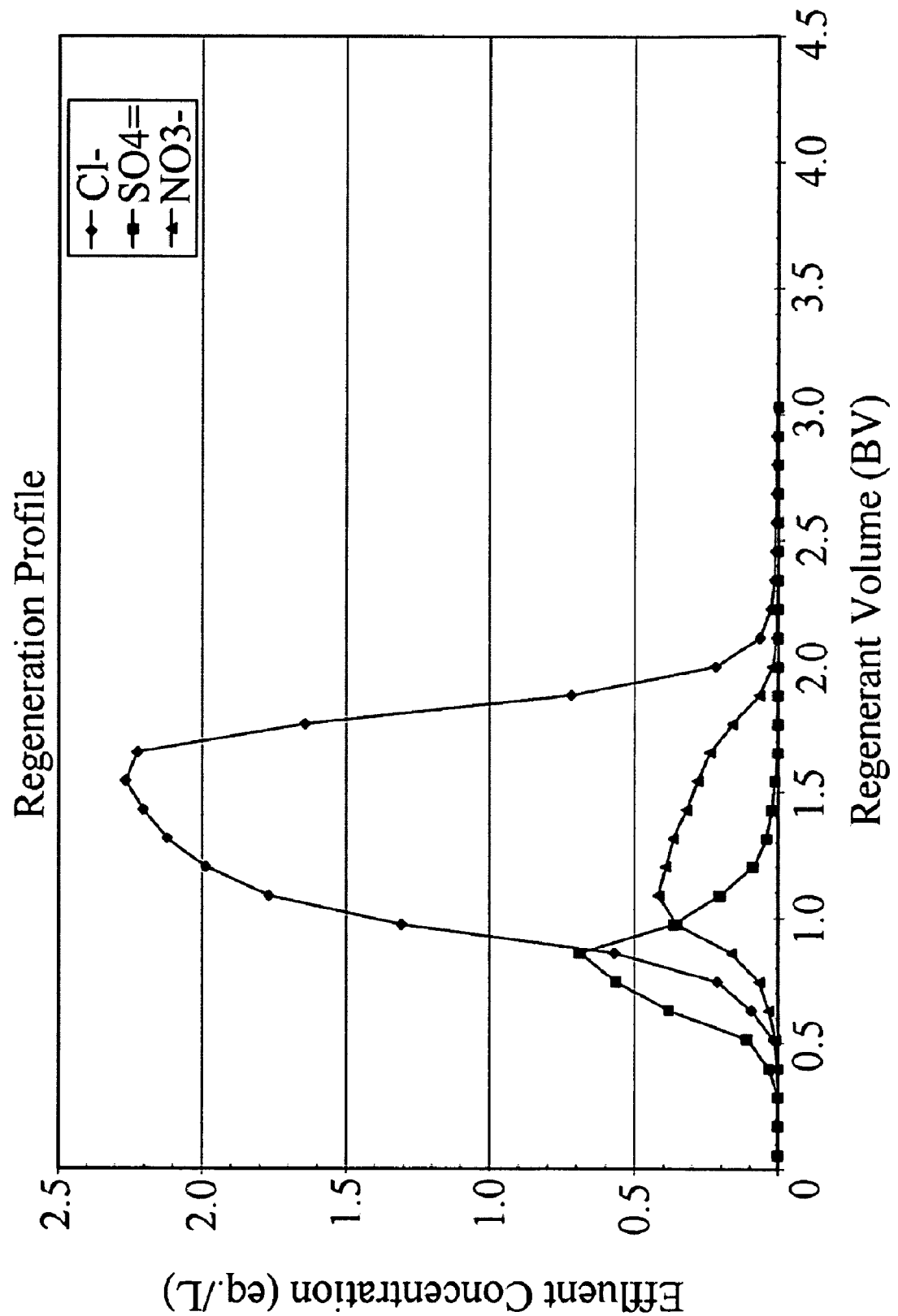
FIG. 5 is a graph of a regeneration cycle profile for an ion exchange portion of a water treatment system using a single regenerant solution.

100 mL fractions of the spent aqueous regenerant solution and the rinse solution emerging from the ion exchange column were collected and analyzed for $Cl^-$, $SO_4^{2-}$, and $NO_3^-$. The results of these analyzes are provided in graphical form in FIG. 5.

Example 2

Ion Exchange and Regeneration with 2 Regenerant Solutions

The apparatus used for Example 2 is depicted in FIG. 2. The ion exchange column, for-treatment solution, and loading cycle conditions were the same as used in Example 1.

Following a loading cycle, 1.4 L (1.6 BV) of a first aqueous regenerant solution (a.k.a. "low concentration regenerant solution") having a NaCl concentration of 0.43 eq/L (25 g/L) was then fed through the ion exchange column in a downflow direction at a rate of 58.3 mL/min (4.0 BV/hr). This volume and concentration corresponds to a NaCl dose of 0.69 eq/L·resin (40 g/L·resin).

0.7 L (0.8 BV) of a second aqueous regenerant solution (a.k.a. "high concentration regenerant solution") having a NaCl concentration of 2.57 eq/L (150 g/L) was then fed through the ion exchange column in a downflow direction at a rate of 58.3 mL/min (4.0 BV/hr). This volume and concentration corresponds to a NaCl dose of 2.06 eq/L·resin (120 g/L·resin). The total of both regeneration solutions is a NaCl dose of 2.75 eq/L·resin (160 g/L·resin), the same as in Example 1. The second aqueous regenerant solution was then rinsed from the ion exchange column using 1,750 mL (2.0 BV) of a rinse solution having the same composition as the for-treatment water. The rinse solution was fed to the ion exchange column in a downflow direction at a rate of 58.3 mL/min (4.0 BV/hr).

Figure 6:
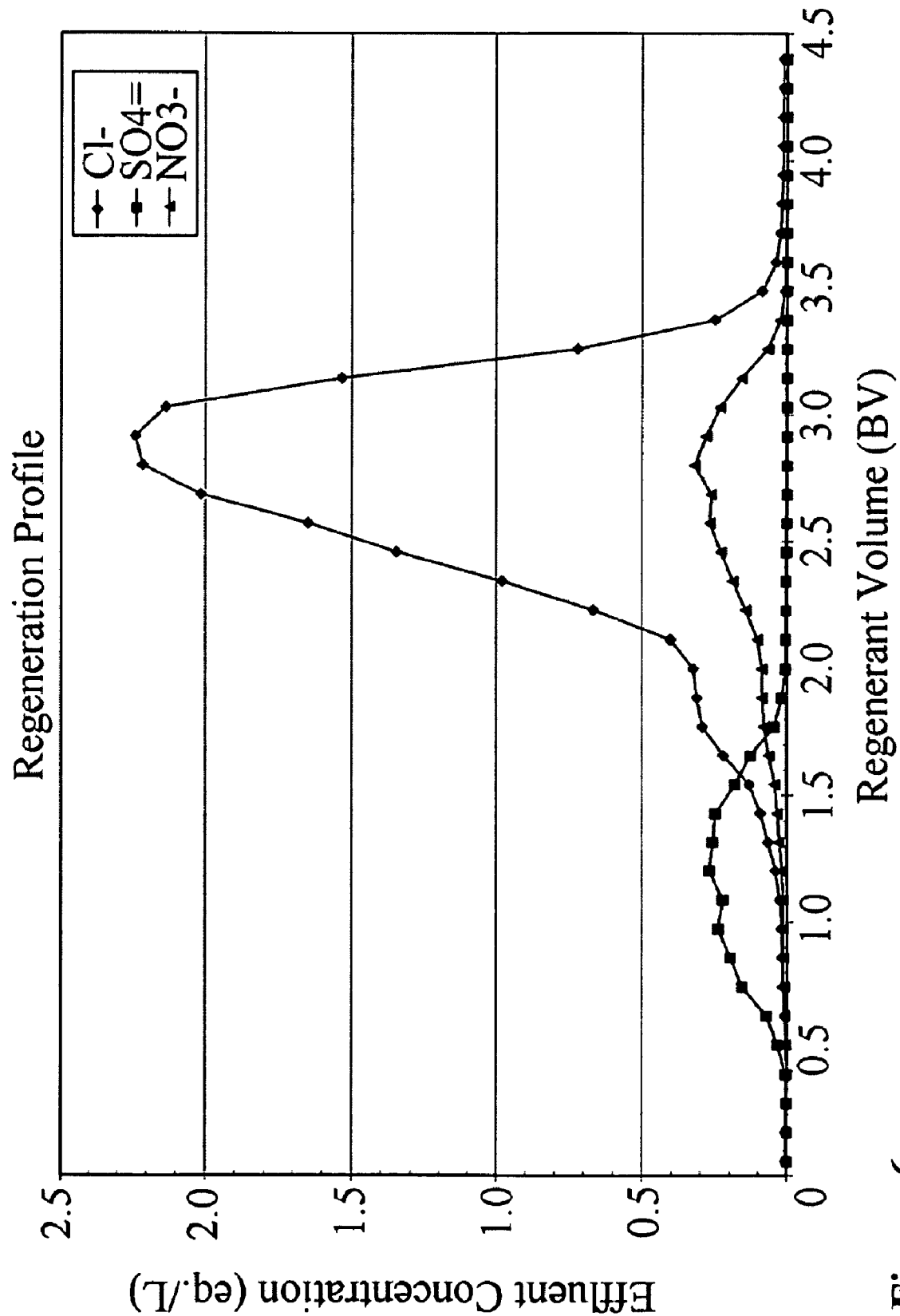
FIG. 6 is a graph of a regeneration cycle profile for an ion exchange portion of a water treatment system using multiple regenerant solutions.

100 mL fractions of the spent regenerant solutions emerging from the ion exchange column were collected and analyzed for $Cl^-$, $SO_4^{2-}$, and $NO_3^-$. The results of these analyzes are provided in graphical form in FIG. 6. As depicted in the results provided in FIG. 6 it can be seen that by using two different aqueous regenerant solutions it was possible to separate the target ion (i.e., $NO_3^-$) from the non-target ion (i.e., $SO_4^{2-}$), generating a target ion rich fraction with only a small amount of the non-target ion.

Example 3

Ion Exchange and Regeneration with Partial Regenerant Recycle

The apparatus used for this Example 3 is depicted in FIG. 3. The for-treatment water conditions and column loading used was the same as that for Example 2. The apparatus was automated with an in-line $NO_3^-$ sensor in the outflow from the ion exchange column. This sensor used a UV fiber optic probe connected to a spectrophotometer to collect a spectrum from 200-500 nm each 15 s. Deconvolution of the spectrum gave the $NO_3^-$ concentration from 1 μeq/L to 1 eq/L with better than 5% accuracy. For-treatment water was fed through the ion exchange column in an upward flow direction until the concentration of $NO_3^-$ in the effluent from column reached 0.5 meq/L (a loading cycle).

Each loading cycle was followed automatically by a regeneration cycle. Each regeneration cycle comprised a first stage regeneration in which a first aqueous regenerant solution was fed in a downward flow direction through the ion exchange column; a second stage regeneration in which a second aqueous regenerant solution was fed in a downward flow direction through the ion exchange column; and a rinse in which a rinse solution was fed in a downward flow direction through the ion exchange column; wherein the first stage regeneration, the second stage regeneration and the rinse were performed one after the other in sequence.

During each first stage regeneration 1.2 BV of the first aqueous regenerant solution (a.k.a. "low concentration regenerant solution") having an initial concentration of 0.43 eq/L (25 g/L of NaCl) was passed through the ion exchange column. The target dose of $Cl^-$ ions delivered to the column by the first aqueous regenerant solution was 0.51 eq/L·resin (30 g/L·resin).

During each second stage regeneration 2.4 BV of the second aqueous regenerant solution (a.k.a. "high concentration regenerant solution") having an initial concentration of 2.57 eq/L (150 g/L of NaCl) was passed through the ion exchange column. The target dose of $Cl^-$ ions delivered to the column by the second aqueous regenerant solution was 6.17 eq/L·resin (360 g/L·resin). The target dose of $Cl^-$ ions delivered to the column by the both regenerant solutions was 6.67 eq/L·resin (390 g/L·resin).

During each rinse 1.73 BV of the rinse solution was passed through the ion exchange column. The water used for the rinse solution was taken from the effluent from the ion exchange column during the middle of a loading cycle. The $NO_3^-$ concentration of the rinse solution was about 0.01 meq/L (0.6 mg/L).

During each regeneration cycle, the first 1.73 BV of effluent from the ion exchange column was discharged to sewer. Notwithstanding, in operation, this cut could be blended with the treated product water. The effluent from 1.73 BV to 4.13 BV was transferred to an electrochemical destruct unit, then discarded. The effluent from 4.13 BV to 5.33 BV is recycled to the low concentration regenerant tank be used in a subsequent regeneration cycle as the first aqueous regenerant solution. These recycle cuts were determined as follows: (a) a single regeneration cycle was performed under the subject conditions; (b) the $Cl^-$ effluent curve was integrated to determine the cumulative quantity of $Cl^-$ in the spent regenerant; (c) the volume at which the remaining $Cl^-$ equals that used in the first aqueous regenerant solution was determined; (d) once the volume in (c) is determined, it was possible to determine where all the remaining effluent cuts should be made.

Figure 7:
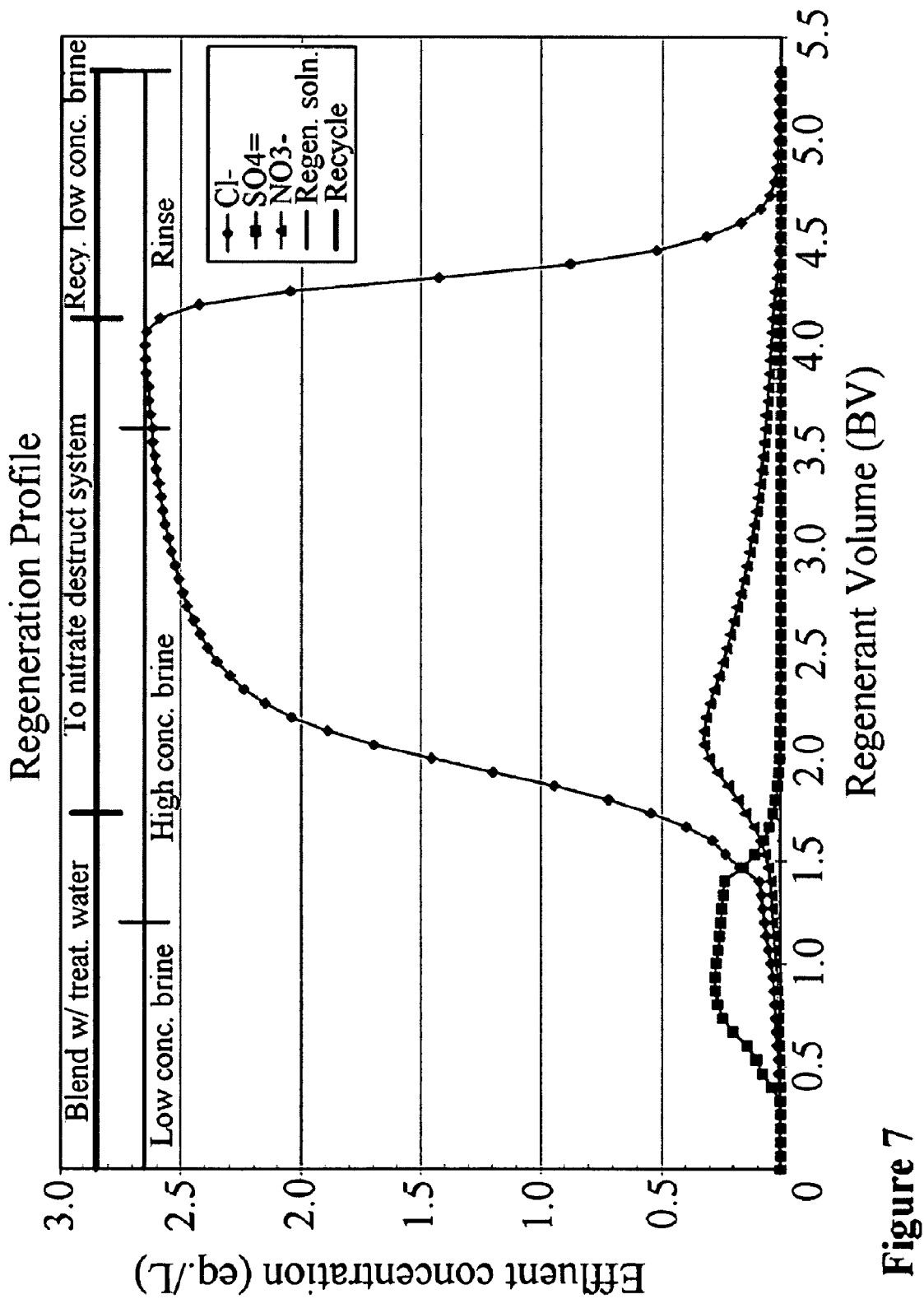
FIG. 7 is a graph of a regeneration cycle profile for an ion exchange portion of a water treatment system using multiple regenerant solutions, wherein some of the regenerant solutions are recycled.

The process was run for 22 successive loading and regeneration cycles. The first aqueous regenerant solution was recycled as noted above. The second aqueous regenerant solution was prepared fresh for each regeneration cycle. The average regeneration effluent profile for the 22 cycles as well as the influent and recycle schemes are depicted in graphical form in FIG. 7.

Comparative Example 4

Destruct Cycle with Continuous Current

The electrochemical cell system used for the Example 4 is depicted in FIG. 4. A nitrate rich solution (a.k.a. catholyte solution) was held in a Catholyte Tank. The catholyte solution was pumped by a Catholyte Pump through a Heat Exchanger, past sensors for temperature, pH, and $NO_3^-$ concentration, through a cathode side of an electrochemical cell, and back to the Catholyte Tank. Valve V-16 regulated the pressure of the catholyte solution within the electrochemical cell. The Heat Exchanger used steam to regulate the temperature of the catholyte solution, based on the readings from the temperature sensor. The pH of the catholyte solution was regulated by the addition of a 3 N HCl solution or a 2 N NaOH solution, as appropriate, based on the readings from the pH sensor.

The $NO_3^-$ concentrations reported in the Examples were measured spectrophotometrically. A fiber optic probe was placed in the solution while connected to a UV-visible spectrophotometer. Spectra were then collected from 200-500 nm and the concentration of $NO_3^-$ and $NO_2^-$ were determined by deconvolution. $NO_3^-$ has a very strong absorption peak near 200 nm and a weak absorption peak near 301 nm ($\epsilon=7.04\pm0.04$ $M^{-1}$ $cm^{-1}$). $NO_2^-$ has a very strong absorption peak near 200 nm and a weak absorption peak near 355 nm ($\epsilon=22.4\pm0.8$ $M^{-1}$ $cm^{-1}$). Other common anions that may be present in the cathodic solution, for example $Cl^-$, $HCO_3^-$, or $SO_4^{2-}$, only have weak absorption below 225 nm. Calibration of the system indicates that $NO_3^-$ and $NO_2^-$ concentrations can be measured in the catholyte solution from 0.01 mM to 1 M with an accuracy of ±5%.

The Catholyte Tank and the Anolyte Tank were made from HDPE. The piping and valves were made from CPVC with Viton® o-rings. The Catholyte Pump and the Anolyte Pump were centrifugal pumps with Teflon® heads. The tubes of the heat exchanger were made from Hastelloy®.

The headspace over the catholyte solution was continuously swept with nitrogen gas and vented through a scrubber containing 3 N HCl. This helped to prevent the buildup of explosive levels of $H_2$ and removed any $NH_3$ that might have been formed.

The headspace over the anolyte solution was continuously swept with nitrogen gas and vented through a scrubber containing 2 N NaOH. This helped to prevent the buildup of a pure $O_2$ atmosphere and removed any $Cl_2$ that might have been formed.

The cathodic compartment of the electrochemical cell consisted of a titanium current collector pressed up against a carbon felt cathode. The anodic compartment of the electrochemical cell consisted of an $IrO_2$ coating on a titanium support as the anode. The two compartments were separated by a Nafion® membrane. The body of the cell was made from HDPE, with Viton® o-rings where necessary to provide leak tight seals. The exposed area of the cathode, anode, and the membrane were each 0.01 $m^2$.

A DC power supply was connected to the anode and cathode. The power supply operated in a constant current mode, with the output voltage floating to provide the necessary current.

The entire system was under the control of a Programmable Logic Controller (PLC) and a Personal Computer (PC) to control temperature and pH, deconvolute the UV-visible spectrum to determine $NO_3^-$ and $NO_2^-$ concentrations every 15 s, and record data for further analysis.

The following experimental conditions were used:
Anolyte Tank: 7.5 L 1.69 M $H_2SO_4$ (15%)
Catholyte Tank: 6.7 L 2.50 M NaCl, 0.107 M $NaNO_3$ (6.6 g/L $NO_3^-$)
Anolyte Pump: 4 L/min
Catholyte Pump: 4 L/min
Operating Temp: 50° C.
Operating pH Range: 3-10
Operating Current: 12.5 A.

The electrochemical cell was operated until the final $NO_3^-$ concentration was 5 meq/L (310 mg/L). This corresponded to the destruction of 95% of the $NO_3^-$ introduced to the electrochemical cell system. The total elapsed time was 1,116 min. The destruct rate was 2.27 g/hr, the electrode efficiency was 227 g/hr/$m^2$, and the current efficiency was 0.182 g/hr/A. This current efficiency is 63% of the theoretical value for $NO_3^-$ reduction to $NH_3$.

Example 5

Destruct Cycle with Interrupted Current

Example 4 was repeated with 1 change—the DC power supply was periodically interrupted. That is, the supply was turned on for 177 min and then turned off for 3 min during each 3 hr power cycle, which repeated until the 5 meq/L endpoint was reached. The total elapsed time was 790 min. The destruct rate was 3.20 g/hr, the electrode efficiency was 320 g/hr/$m^2$, and the current efficiency was 0.256 g/hr/A. The current efficiency was 89% of the theoretical value for $NO_3^-$ reduction to $NH_3$. This represented a 41% improvement in the electrode and current efficiency compared to Example 4, even though the power supply was off for 1.9% of the destruction time.

Example 6

Destruct Cycle with Interrupted Current

Example 4 was repeated with 1 change—the power supply was turned on for 13.7 min and then turned off for 3 min during each 16.7 min cycle. The total elapsed time to the 5 meq/L endpoint was 980 min. The destruct rate was 2.58 g/hr, the electrode efficiency was 258 g/hr/m$^2$, and the destruct efficiency was 0.206 g/hr/A. This represented a 14% improvement in the electrode and current efficiency compared to Example 4, even though the power supply was off for 18% of the destruction time.

Example 7

Replicated Destruct Cycles

Examples 4 and 5 were repeated several times to generate statistical results. The mean results are presented in Table 1.

TABLE 1

| | Cycle Duration | | | Duration | | Efficiency | |
|---|---|---|---|---|---|---|---|
| Ex. | On (min) | Off (min) | Replicates | Overall (min) | On (min) | Electrode (g/hr/m$^2$) | Current (g/hr/A) |
| 4 | Not cycled | | 5 | 1055 ± 90 | | 236 ± 23 | 0.19 ± 0.02 |
| 5 | 177 | 3 | 5 | 829 ± 31 | 814 ± 31 | 300 ± 11 | 0.24 ± 0.01 |

With 5 replicates for each set of test conditions, the destruct efficiency for the interrupted power experiments was 127±13% of that for the uninterrupted power experiments, even though the power was only on for 98% of the time. These results illustrate that periodically interrupting the power to the electrochemical cell significantly improved the rate and efficiency of the $NO_3^-$ destruct process.

Example 8

Integrated Ion Exchange/$NO_3^-$ Destruct System with Uninterrupted Current

The integrated system used for this Example 8 is depicted in FIG. 1. The automated ion exchange system used in Example 3 and the automated nitrate destruct system used in Examples 4-7 were used in this Example 8.

The ion exchange column was filled with a nitrate selective exchange resin (IMAC HP555 from Rohm and Haas Company). The for-treatment water fed to the integrated system was 2.0 meq/L NaCl, 1.5 meq/L NaNO$_3$, 1.5 meq/L NaHCO$_3$, and 1.5 meq/L Na$_2$SO$_4$. The $NO_3^-$ concentration in the effluent from the ion exchange column was continuously monitored using an in-line sensor. When the $NO_3^-$ concentration in the effluent from the ion exchange column reached 0.5 meq/L, the flow of for-treatment water to the ion exchange column was stopped and the ion exchange column was regenerated using three solutions: (a) a first aqueous regenerant solution (a.k.a. "low concentration regenerant"), (b) a second aqueous regenerant solution (a.k.a. "high concentration regenerant") and (c) a rinse solution. The first aqueous regenerant solution was 1.2 BV with an initial concentration of 0.43 eq/L NaCl. The second aqueous regenerant solution was 2.4 BV with an initial concentration 2.57 eq/L NaCl. The rinse solution was 1.73 BV of treated water. These are the same loading and regeneration conditions utilized in Example 3. The first 1.73 BV of the spent regenerant solution was discarded. The next 2.4 BV of the spent regenerant, the water rich in the target ion ($NO_3^-$), was directed to the electrochemical cell for further treatment. The final 1.2 BV of spent regenerant solution was recycled to the low concentration regenerant tank and used in the next regeneration cycle as the first aqueous regenerant solution. Following the regeneration cycle, the ion exchange column began a new loading cycle.

The water rich in the target ion from 2 successive regeneration cycles was collected in a transfer holding tank until the destruct system was ready. After filling the catholyte tank by opening valve V-18 (see FIG. 1), a $NO_3^-$ destruct cycle was initiated, with uninterrupted power. The destruct cycle continued until the $NO_3^-$ concentration in the water in the catholyte tank was less than 5 meq/L, producing water depleted in the target ion. All other electrochemical operating conditions were the same as those used in Example 4.

The water depleted in the target ion was recycled back to the high concentration regenerant tank by turning on the catholyte pump, closing valve V-19 and opening Valve V-20 (see FIG. 1). Solid NaCl was then added to the solution to raise its NaCl concentration to 2.6 eq/L. The resultant solution was used in a subsequent regeneration cycle as the second aqueous regenerant solution.

The integrated system was run continuously for 99 loading/regeneration cycles over 40 days. The mean loading cycle length was 308±11 BV. The mean $NO_3^-$ destruct cycle time was 897±126 min with a mean of 0.634±0.011 mol/cycle of $NO_3^-$ destroyed. The mean electrode efficiency was 267±33 g/hr/m$^2$ and the mean current efficiency was 0.214±0.026 g/hr/A. The current efficiency was 74% of the theoretical value for $NO_3^-$ reduction to $NH_3$.

A continuous sweep of nitrogen was passed through the headspace over the catholyte tank with a flow rate of 1.0 L/min. This sweep gas operated to enhance the rate of evaporation of the catholyte solution. In the absence of such enhanced evaporation, the volume of the high concentration regenerant/catholyte solution would have increased about 15.7 L during the 49 consecutive destruct cycles performed in this Example 8 as a result of product water, electro-osmosis transport of water from the anolyte, and the added aqueous acid. With the enhanced evaporation facilitated by the sweep gas, the volume of the high concentration regenerant/catholyte solution only increased 9.8 L. Accordingly, the 1.0 L/min sweep gas facilitated the removal of 38% of the water added to the catholyte solution.

Example 9

Integrated Ion Exchange/$NO_3^-$ Destruct System with Interrupted Current

Example 8 was repeated with 3 changes: the power was repetitively cycled on for 59 min, off for 1 min; the destruct cycle continued to an endpoint of 2.5 meq/L $NO_3^-$; and the system was operated continuously for 158 ion exchange cycles over 67 days.

Figure 8:
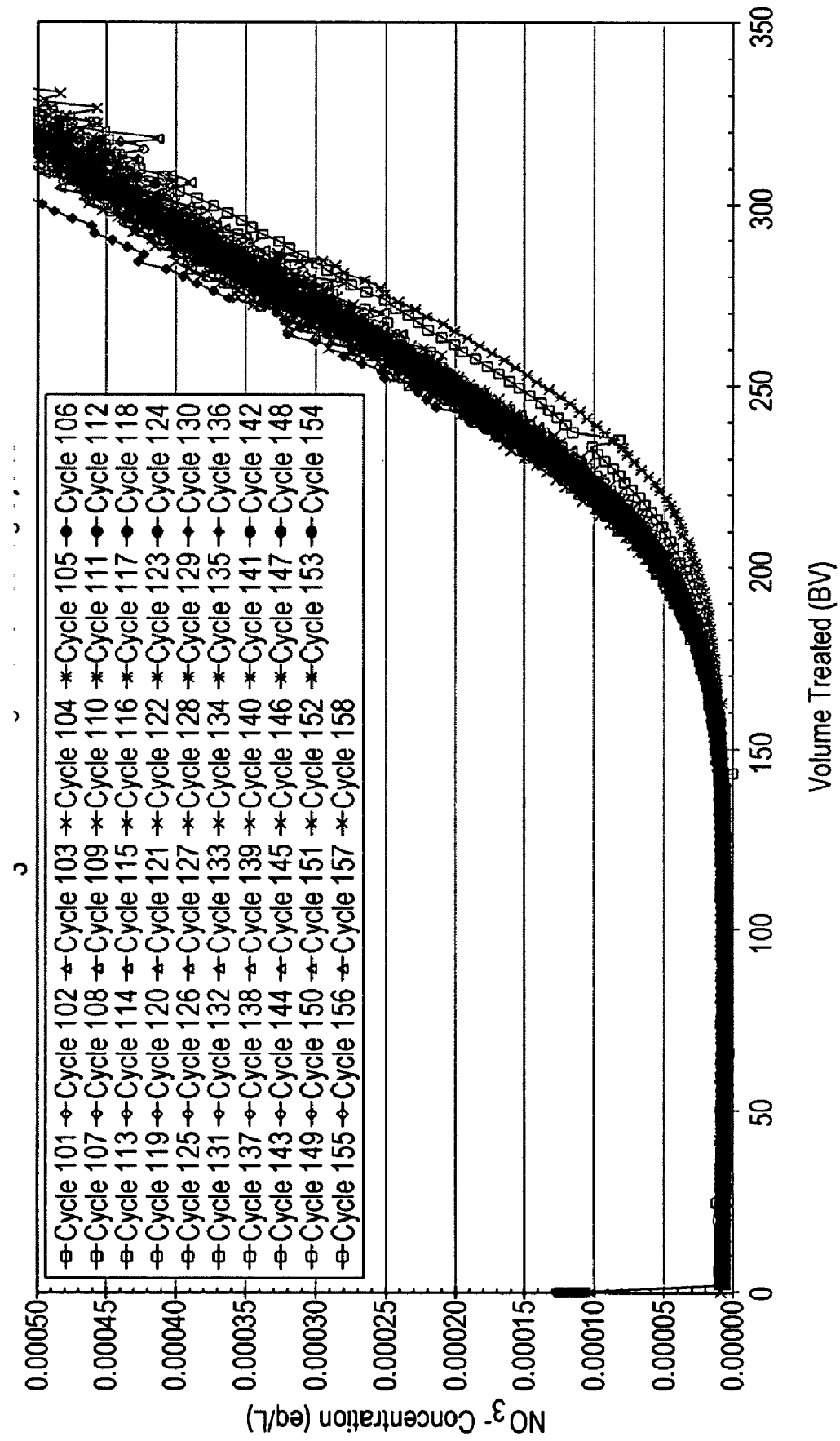
FIG. 8 is a graph of $NO_3^-$ concentration in a treated water versus volume of for-treatment water treated for multiple loading cycles using recycled regenerant solutions.

The mean ion exchange cycle length was 320±5 BV. FIG. 8 provides breakthrough curves for ion exchange cycles 101 to 158. The results depicted in FIG. 8 illustrate the stability of the ion exchange system with respect to cycle length and low level leakage that was obtained when using recycled low concentration regenerant and recycled/reconstituted high concentration regenerant solution.

At the completion of ion exchange cycle 158, the $SO_4^{2-}$ concentration in the low concentration regenerant was 5 meq/L (240 mg/L) and the $SO_4^{2-}$ in the high concentration regenerant was 25 meq/L (1200 mg/L). The $Cl^-$ concentration in the low concentration regenerant solution was 0.41 eq/L and the $Cl^-$ concentration in the high concentration regenerant solution was 2.61 eq/L. Accordingly, the $Cl^-$ to $SO_4^{2-}$ equivalent ratios were 80 and 100 for the low and high regenerant solutions, respectively. This illustrates how well the integrated ion exchange/destruct system eliminated $SO_4^{2-}$ from the spent regenerant fractions that were recycled, preventing buildup in the recycled regenerant solutions over many cycles. It further illustrates the stability of the $Cl^-$ concentration in both the low concentration and high concentration regenerant solutions that were recycled for 158 ion exchange cycles.

The mean $NO_3^-$ destruct cycle length was 652±52 min/cycle with a mean of 0.657±0.011 mol/cycle of $NO_3^-$ destroyed. The mean electrode efficiency was 377±33 g/hr/m². The mean current efficiency was 0.302±0.026 g/hr/A. The mean current efficiency was 41% higher than that obtained with the same ion exchange/regeneration system with uninterrupted power. The current efficiency was 104% of the theoretical value for $NO_3^-$ reduction to $NH_3$.

Figure 9:
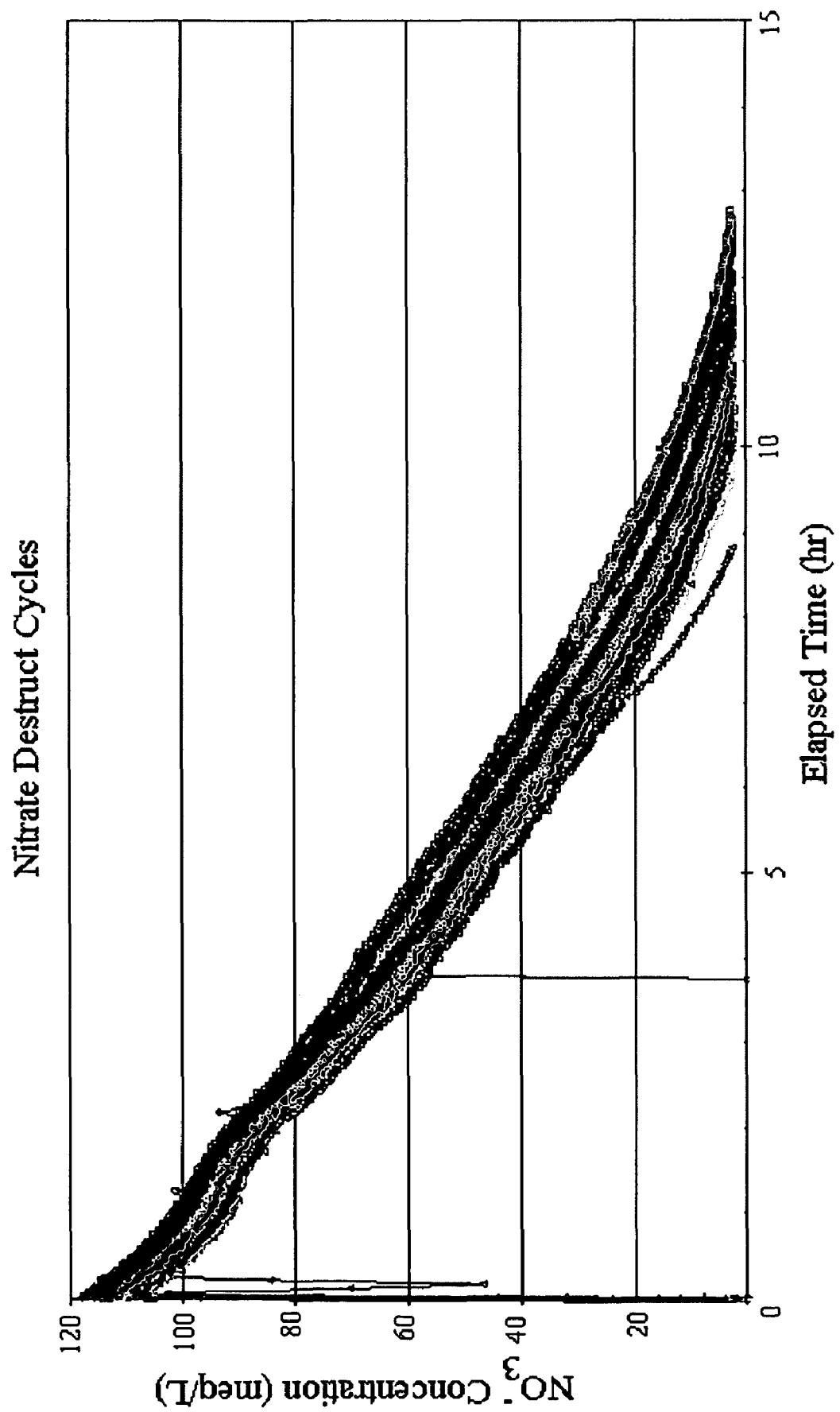
FIG. 9 is a graph of $NO_3^-$ concentration in a catholyte solution versus elapsed time in an electrochemical cell nitrate destruct system for multiple destruct cycles using recycled regenerant solutions.

The concentration of $NO_3^-$ in the catholyte solution (a.k.a. "water rich in target ion") as a function of elapsed time in the electrochemical cell during the nitrate destruct cycle is provided in FIG. 9 for nitrate destruct cycles 51 to 80. The stability of the destruct portion of the ion exchange/destruct system is apparent from the graph provided in FIG. 9.

A continuous sweep of nitrogen was passed through the headspace over the catholyte tank with a flow rate of 2.0 L/min. This sweep gas operated to enhance the rate of evaporation of the catholyte solution. In the absence of such enhanced evaporation, the volume of the high concentration regenerant/catholyte solution would have increased about 26.4 L during the 80 consecutive destruct cycles performed in this Example 9 as a result of product water, electro-osmosis transport of water from the anolyte, and the added aqueous acid. With the enhanced evaporation facilitated by the sweep gas, the volume of the high concentration regenerant/catholyte solution only increased 9.8 L. Accordingly, the 2.0 L/min sweep gas facilitated the removal of 70% of the water added to the catholyte solution.

I claim:

1. A process for removing a target ion from a for-treatment water containing the target ion, wherein the target ion is nitrate; comprising:
   iii) a destruct cycle comprising:
      (a) passing a nitrate rich water through an electrochemical cell comprising an anode and a cathode, and
      (b) passing a current between the anode and the cathode;
   wherein nitrate is reduced to $N_2$, $NH_3$ or $NH_4^+$ during a destruct cycle producing a nitrate depleted water, wherein the current is periodically interrupted during the destruct cycle while the nitrate rich water is passing through the electrochemical cell, wherein the nitrate rich water is passed through the electrochemical cell over a cycle time; wherein the current is passed between the anode and the cathode over an on time; and wherein the on time is less than the cycle time.

2. The process of claim 1, wherein the on time equals 95 to 99.99% of the cycle time.

3. A process for removing a target ion from a for-treatment water containing the target ion, wherein the target ion is nitrate; comprising:
   i) an ion exchange loading cycle comprising passing the for-treatment water through an ion exchange column containing a nitrate selective exchange resin to extract the nitrate from the for-treatment water producing a product treated water;
   ii) a regeneration cycle comprising regenerating the ion exchange column by:
      a) passing a first aqueous regenerant solution with a first regenerant ion through the ion exchange column to remove ions held less strongly to the nitrate selective exchange resin than nitrate;
      b) then passing a second aqueous regenerant solution with a second regenerant ion through the ion exchange column to remove the nitrate from the nitrate selective exchange resin producing a nitrate rich water; and,
      c) then rinsing the ion exchange column with a third aqueous regenerant solution; and,
   iii) a destruct cycle comprising passing the nitrate rich water through an electrochemical cell comprising an anode and a cathode and passing a current between the anode and the cathode, wherein the nitrate is reduced to $N_2$, $NH_3$ or $NH_4^+$ during the destruct cycle producing a nitrate depleted water, wherein the current is interrupted at least once while the nitrate rich water is passing through the electrochemical cell, wherein the nitrate rich water is passed through the electrochemical cell over a cycle time, wherein the current is passed between the anode and the cathode over an on time; wherein the on time is less than the cycle time, and wherein the nitrate is destroyed producing a nitrate depleted water.

4. The process of claim 3, further comprising:
   iv) repeating i) to iii).

5. The process of claim 4, further comprising:
   adding an aqueous acid to the nitrate rich water to maintain the pH thereof in the electrochemical cell and using a sweep gas to enhance the rate of evaporation of water from the nitrate rich water.

6. The process of claim 5, wherein the amount of water evaporated from the nitrate rich water is 95 to 100 vol % of the volume of water added to the nitrate rich water during the destruct cycle.

7. The process of claim 6, wherein the nitrate is reduced to $NH_3$.

8. The process of claim 3, wherein the on time equals 95 to 99.99% of the cycle time.

9. The process of claim 1, wherein the electrochemical cell is a two compartment electrochemical cell having a cathodic compartment and an anodic compartment with a membrane separating the two compartments.

* * * * *